United States Patent [19]
Sakata

[11] Patent Number: 5,982,415
[45] Date of Patent: *Nov. 9, 1999

[54] VIDEO COMMUNICATION SYSTEM WITH SYNCHRONOUS VIDEO OUTPUT FROM A PLURALITY OF TERMINALS

[75] Inventor: Tsuguhide Sakata, Sagamihara, Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/559,825

[22] Filed: Nov. 17, 1995

[30] Foreign Application Priority Data

Nov. 25, 1994 [JP] Japan ..................... 6-291257

[51] Int. Cl.⁶ ............... H04N 7/14; H04L 12/16
[52] U.S. Cl. .................. 348/17; 348/16; 370/260
[58] Field of Search .................. 348/14–17, 20; 395/200.04, 330, 200.34; 379/90, 202, 90.01; 370/260, 263, 264, 265, 270; 345/330

[56] References Cited

U.S. PATENT DOCUMENTS

| | | | |
|---|---|---|---|
| 4,449,238 | 5/1984 | Lee et al. | 348/15 |
| 4,650,929 | 3/1987 | Boerger et al. | 348/15 |
| 5,187,571 | 2/1993 | Braun et al. | 348/15 |
| 5,408,261 | 4/1995 | Kamata et al. | 348/17 |
| 5,453,780 | 9/1995 | Chen et al. | 348/16 |
| 5,512,937 | 4/1996 | Beierle | 379/90 |
| 5,568,185 | 10/1996 | Yoshikazu | 348/14 |
| 5,627,825 | 5/1997 | Barraclough et al. | 348/15 |

Primary Examiner—Curtis A. Kuntz
Assistant Examiner—George Eng
Attorney, Agent, or Firm—Fitzpatrick, Cella, Harper & Scinto

[57] ABSTRACT

A video communication system includes a terminal unit for transmitting/receiving an information signal including video information, and a repeater to which a plurality of terminal units each identical to the terminal unit can be connected. The repeater generates a reference sync. signal for causing the plurality of connected terminal units to synchronously operate, and supplies the generated reference sync. signal to each of the plurality of connected terminal units. The repeater forms a transmission signal to be transmitted to a transmission line by synthesizing information signals respectively transmitted from the plurality of terminal units which are synchronously operating in accordance with the reference sync. signal, and outputs the formed transmission signal to the transmission line. This arrangement realizes an on-seat type multipoint video conference, at a low cost, which is held while a plurality of participants are sitting on seats, without making any preparations before the video conference, e.g., reservation of a conference room, movement to the conference room, and carrying of references.

70 Claims, 14 Drawing Sheets

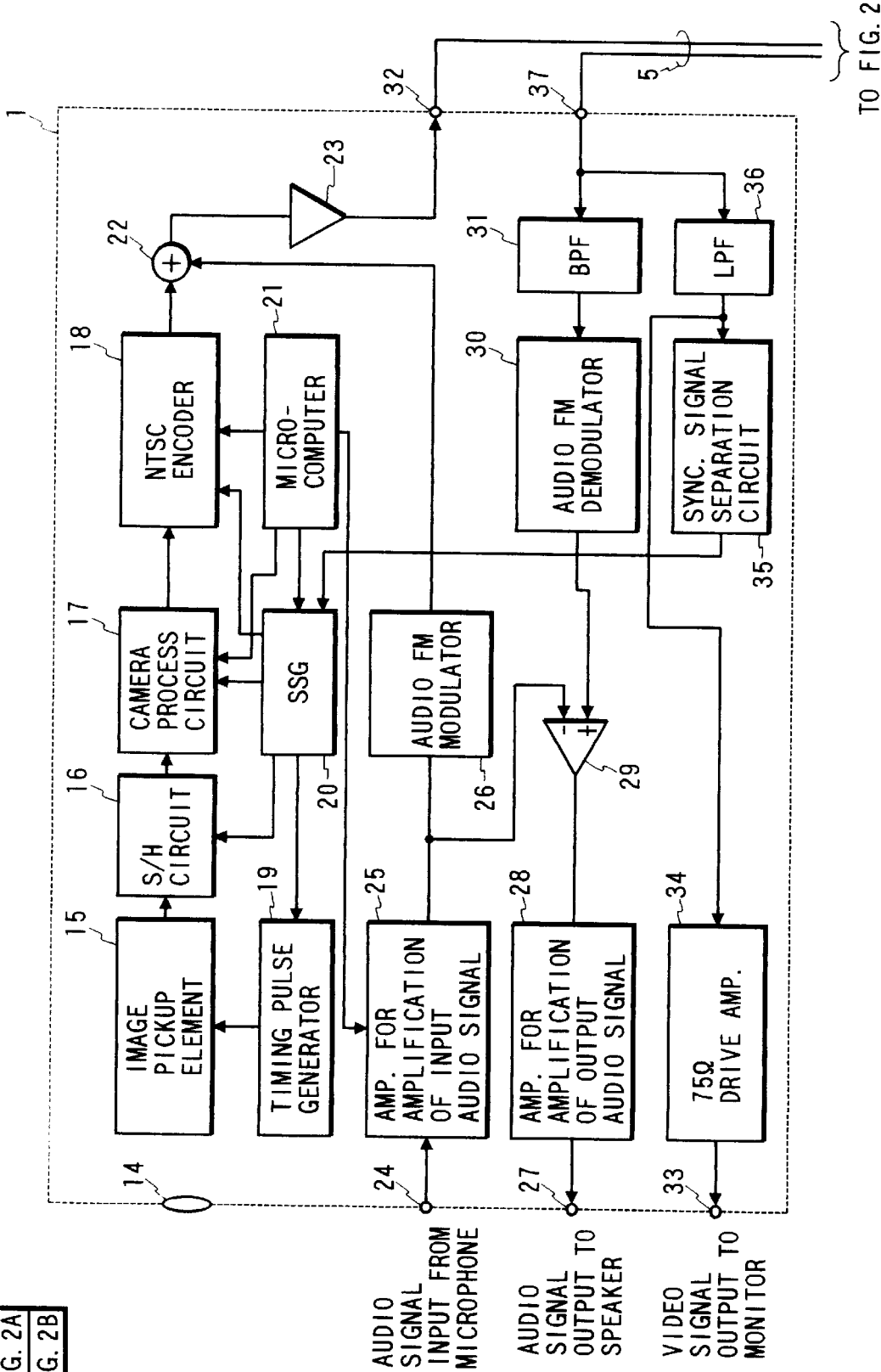

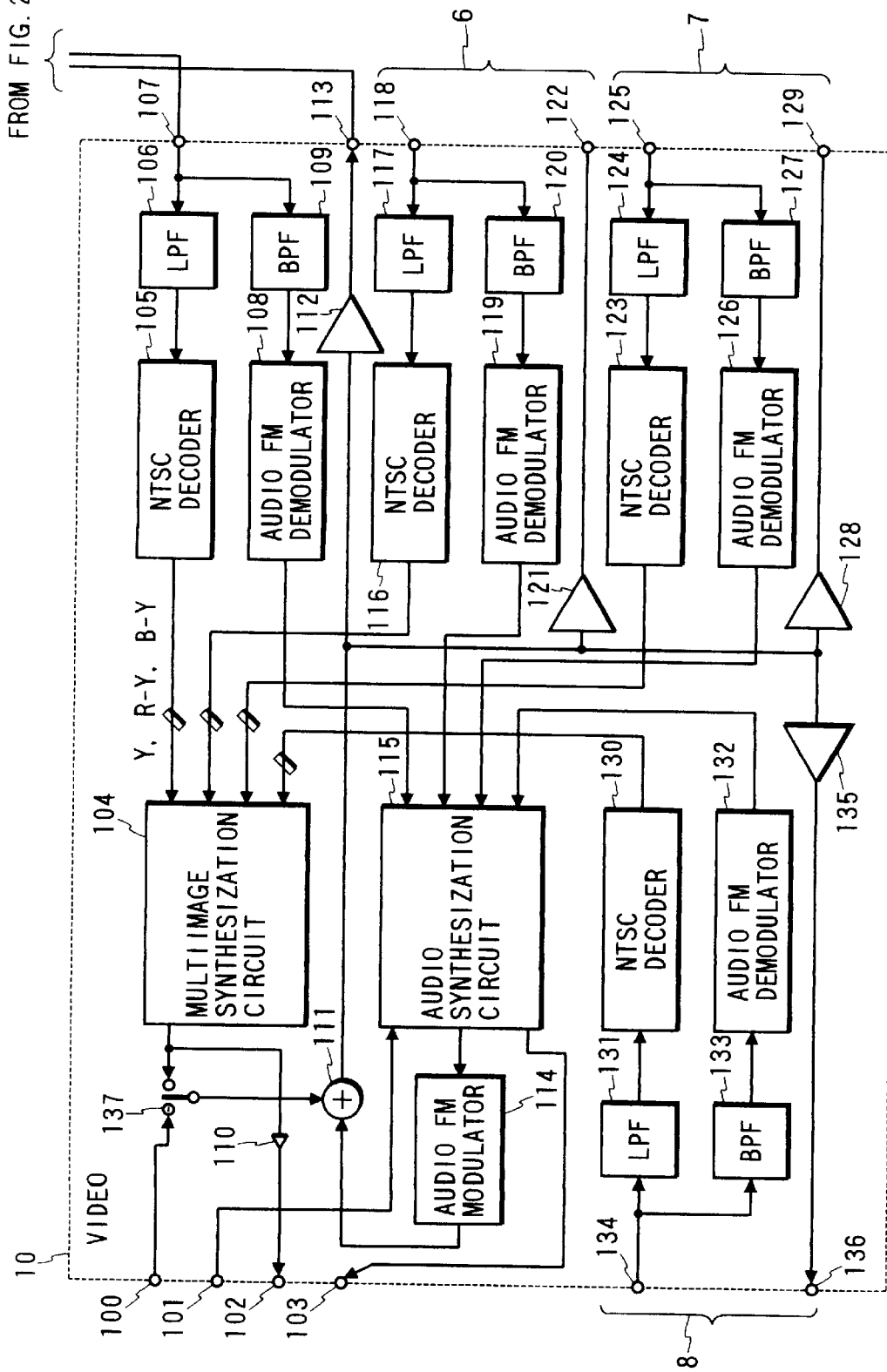

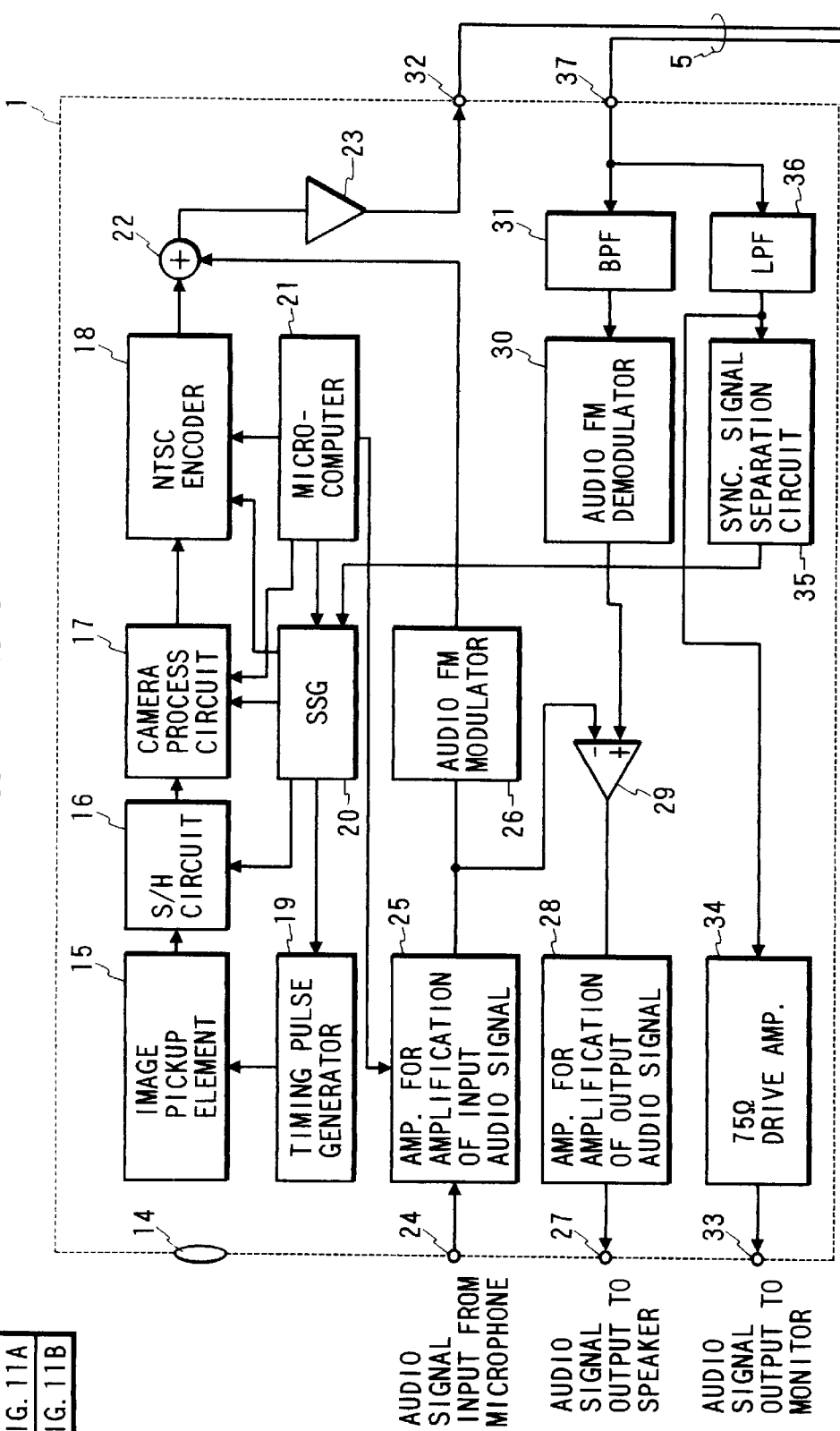

VIDEO COMMUNICATION SYSTEM WITH SYNCHRONOUS VIDEO OUTPUT FROM A PLURALITY OF TERMINALS

BACKGROUND OF THE INVENTION

1. Field of the Invention

The present invention relates to a video communication system for exchanging video information, audio information, and data between a plurality of terminal units.

2. Related Background Art

As conventional systems for exchanging video information, audio information, and data between a plurality of terminal units, a video phone system, a video conference system, and the like are available.

For example, the conventional video conference system includes a room type system, a roll-about type system, and a desktop type, which are selectively used in accordance with application purposes.

In the conventional room type video conference system, participants in a video conference take seats around a predetermined conference table in a conference room to face a video camera so as to allow the video camera to photograph the participants. At the same time, voices from the respective participants are picked up by a nondirectional microphone which is placed on the conference table to pick up voices from all the participants. In addition, a monitor apparatus for displaying a photographed image taken in a conference room of the other party and sent therefrom is placed in the conference room at a position where the participants seating at the conference table can see (e.g., on a wall).

The above video camera has a so-called zoom function. The video camera is also placed on an automatic panhead which can be operated by remote control with a control console or the like. The video camera on the automatic panhead can be panned or tilted by operating the control console to photograph some of the participants in close-up.

Room type video conference systems similar to the above system are installed for two parties to hold a many-to-many video conference in which a plurality of participants exchange information with a plurality of participants.

The roll-about video conference system is different from the above room type system in that a monitor apparatus smaller in size than the monitor apparatus placed on the wall is placed on, e.g., a cart with castors to be conveyed. In addition to the compact monitor apparatus, equipment required for a video conference, e.g., a video camera, a microphone, a coding/decoding device (to be referred to as a codec hereinafter), and a communication line interface (I/F) are stored in the above cart.

If each party carries a roll-about type video conference system like the one described above into a general conference room, many-to-many video conference can be easily held without preparing dedicated conference rooms in each of which the above room type conference system is installed.

The desktop type video conference system includes a personal computer (to be referred to as a PC hereinafter), a display monitor apparatus for the PC, a keyboard and a mouse for PC input operations, a video camera with a manual panhead, a desk microphone, and the like. An expansion board having a codec and a communication line I/F is mounted in an expansion slot of the PC body. In this system, software for a video conference is executed on the PC to operate the system. With this operation, a video conference can be held.

In the above desktop video conference system, the system is operated by using the keyboard or the mouse for PC input operations. A moving image sent from the other party is displayed by using a display monitor apparatus for the PC instead of using a special monitor apparatus. The image is displayed on the display screen of the monitor apparatus in a window display (overlay) scheme.

If the other party also uses a desktop type video conference system similar to the above system, a one-to-one video conference can be held while both the participants are sitting on seats. If the other party uses a room type conference system or a roll-about type video conference system, a one-to-many video conference can be held while the participants are sitting on seats.

The above conventional video conference systems have the following drawbacks.

When the room or roll-about type video conference system is to be used, since a conference room is indispensable for the system, various preparations, e.g., reservation of a conference room, movement to the conference room, and carrying of references into the conference room, must be made before a video conference. These preparations cause time losses and require cumbersome operations.

When the desktop type conference system is to be used, since a conference can be held, without using any conference room, while each participant is sitting on a seat, the above preparations, e.g., reservation of a conference room, movement to the conference room, and carrying of references into the conference room, need not be made before a video conference. This system is free from the time losses and the cumbersome operations accompanying the various preparations. If, however, both parties use desktop type video conference systems, only a one-to-one video conference can be held. If a one-to-many video conference is to be held, the party of many participants must use the above room or roll-about video conference system and hence must use a conference room. The problems of time losses and cumbersome operations remain unsolved.

If a plurality of room or roll-about type video conference systems installed at multiple points are connected to each other through multipoint control units (to be referred to as MCUs hereinafter), a multipoint video conference can be held. In this case as well, since conference rooms must be used, the above problems cannot be solved. If a plurality of desktop video conference systems installed at multiple points are connected to each other through the above MCUs, an on-seat type multipoint video conference can be held by people at the multiple points. The MCU itself is an expensive device. In addition, lines to be connected are required in number equal to the number of participants in the video conference. For this reason, the charges for lines are high.

SUMMARY OF THE INVENTION

It is an object of the present invention to provide a video communication system which can solve the above problems.

It is another object of the present invention to provide a video communication system which can realize an on-seat type multipoint video conference, at a low cost, which is held while a plurality of participants are sitting on seats, without making any preparations before the video conference, e.g., reservation of a conference room, movement to the conference room, and carrying of references.

In order to achieve the above objects, according to an aspect of the present invention, there is provided a video communication system comprising a terminal unit for transmitting/receiving an information signal including video information, and a repeater to which a plurality of terminal units each identical to the terminal unit can be connected, the repeater generating a reference sync. signal for causing the plurality of connected terminal units to synchronously operate, supplying the generated reference sync. signal to each of the plurality of connected terminal units, forming a transmission signal to be transmitted to a transmission line by synthesizing information signals respectively transmitted from the plurality of terminal units which are synchronously operating in accordance with the reference sync. signal, and outputting the formed transmission signal to the transmission line.

It is still another object of the present invention to provide a video communication system which can realize an on-seat type multipoint video conference, at a low cost, with high image quality and high sound quality.

In order to achieve the above object, according to another aspect of the present invention, there is provided a video communication system comprising a terminal unit for transmitting/receiving an information signal including video information, and a repeater to which a plurality of terminal units each identical to the terminal unit can be connected, the repeater generating a reference sync. signal for causing the plurality of connected terminal units to synchronously operate, supplying the generated reference sync. signal to each of the plurality of connected terminal units, forming a transmission signal to be transmitted to a transmission line by synthesizing information signals respectively transmitted from the plurality of terminal units which are synchronously operating in accordance with the reference sync. signal, and outputting the formed transmission signal to the transmission line, or receiving a transmission signal supplied from the transmission line and supplying the input transmission signal to each of the plurality of connected terminal units.

The above and other objects, features, and advantages of the present invention will be apparent from the following detailed description in conjunction with the accompanying drawings and the appended claims.

BRIEF DESCRIPTION OF THE DRAWINGS

FIG. 2 is comprised of FIGS. 2A and 2B illustrating block diagrams showing the arrangements of a terminal unit and a synthesization device in FIG. 1;

DETAILED DESCRIPTION OF THE PREFERRED EMBODIMENTS

The first embodiment of the present invention will be described below.

Figure 1:
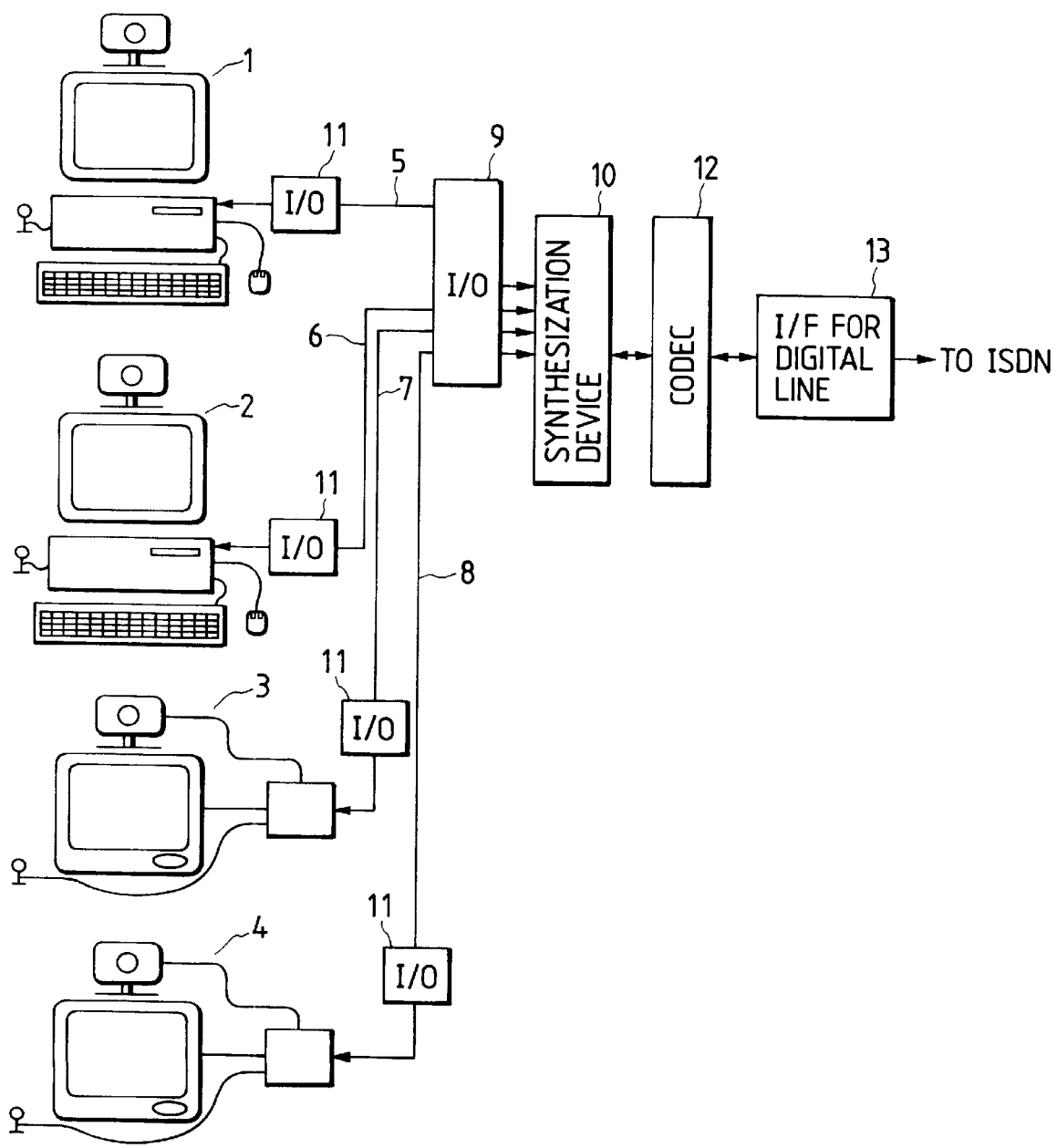
FIG. 1 is a block diagram showing the overall arrangement of a video communication system as the first embodiment of the present invention.

FIG. 1 shows the overall arrangement of a video communication system as the first embodiment of the present invention. Assume that in this embodiment, two parties respectively use video conference systems, each having four terminal units, to hold an on-seat type multipoint video conference in which a plurality of participants of one party exchange information with a plurality of participants on the other party.

Referring to FIG. 1, when an on-seat type multipoint video conference in which a plurality of participants of one party exchange information with a plurality of participants of the other party is to be held by using the video communication system of this embodiment, terminal units 1 to 4 are respectively used by the participants of one party in the video conference while they are sitting on seats. A synthesization device 10 synthesizes image and audio information transmitted from the terminal units 1 to 4. Communication lines 5 to 8 are made of coaxial cables which connect the terminal units 1 to 4 to the synthesization device 10 and send image and audio information. An I/O interface 9 is arranged in the synthesization device 10 for the communication lines 5 to 8. An I/O interface 11 is arranged in each terminal unit for a corresponding one of the communication lines. A codec 12 codes or decodes moving image information or audio information to be transmitted. An I/F 13 for a digital line transmits decoded information data to a distant terminal unit according to a predetermined format or receive information data transmitted from a distant terminal unit through a digital line such as an ISDN (Integrated Service Digital Network). Note that the other party, which holds the video conference through the ISDN, also has a video conference system having the same arrangement as that shown in FIG. 1.

The terminal units 1 to 4 and the synthesization device 10 in FIG. 1 will be described in detail next.

FIGS. 2A and 2B are block diagrams showing the arrangements of the terminal unit 1 and the synthesization device 10. Referring to FIGS. 2A and 2B, the terminal unit 1 includes an image pickup optical lens 14, an image pickup element 15 such as a CCD, a sample/hold (S/H) circuit 16, a camera process circuit 17, an NTSC encoder 18, a timing pulse generator 19 for generating a timing pulse for driving the image pickup element 15, a sync. signal generator (SSG) 20, a microcomputer 21 for controlling the operations of a camera unit, an adder 22, a 75 Ω drive amplifier 23, an audio signal input terminal 24 for inputting an audio signal, an amplifier 25 for amplification of an input audio signal, an audio FM demodulator 26, an audio signal output terminal 27 for outputting an audio signal, an amplifier 28 for amplification of an output audio signal, a subtracter 29, an audio FM demodulator 30, a bandpass filter (BPF) 31 for an audio signal, a transmission signal transmission terminal 32 for transmitting a transmission signal from the terminal unit 1 to the synthesization device 10, a video signal output terminal 33 for outputting a video signal, a 75 Ω drive amplifier 34, a sync. signal separation circuit 35, a low-pass filter (LPF) 36 for a video signal, and a transmission signal reception terminal 37 for receiving a transmission signal transmitted from the synthesization device 10 to the terminal unit 1. The synthesization device 10 includes a video signal reception terminal 100 for receiving a video signal decoded by the codec 12 in FIG. 1, an audio signal reception terminal 101 for receiving an audio signal decoded by the codec 12 in FIG. 1, a video signal transmission terminal 102 for transmitting a video signal to the codec 12 in FIG. 1, an audio signal transmission terminal 103 for transmitting an audio signal to the codec 12 in FIG. 1, a multiimage synthesization circuit 104, an NTSC decoder 105, a low-pass filter (LPF) 106 for a video signal, a transmission signal reception terminal 107 for receiving a transmission signal transmitted from the first terminal unit to the synthesization device 10, an audio FM demodulator 108, a bandpass filter (BPF) 109 for an audio signal, a 75 Ω drive amplifier 110, an adder 111, a 75 Ω drive amplifier 112, a transmission signal transmission terminal 113 for transmitting a transmission signal from the synthesization device 10 to the first terminal unit, an audio FM modulator 114, an audio synthesization circuit 115, an NTSC decoder 116, a low-pass filter (LPF) 117 for a video signal, a transmission signal reception terminal 118 for receiving a transmission signal transmitted from the second terminal unit to the synthesization device 10, an audio FM demodulator 119, a bandpass filter (BPF) 120 for an audio signal, a 75 Ω drive amplifier 121, a transmission signal transmission terminal 122 for transmitting a transmission signal from the synthesization device 10 to the second terminal unit, an NTSC decoder 123, a low-pass filter (LPF) 124 for a video signal, a transmission signal reception terminal 125 for receiving a transmission signal transmitted from the third terminal unit to the synthesization device 10, an audio FM demodulator 126, a bandpass filter (BPF) 127 for an audio signal, a 75 Ω drive amplifier 128, a transmission signal transmission terminal 129 for transmitting a transmission signal from the synthesization device 10 to the third terminal unit, an NTSC decoder 130, a low-pass filter (LPF) 131 for a video signal, an audio FM demodulator 132, a bandpass filter (BPF) 133 for an audio signal, a transmission signal reception terminal 134 for receiving a transmission signal transmitted from the fourth terminal unit to the synthesization device 10, a 75 Ω drive amplifier 135, a transmission signal transmission terminal 136 for transmitting a transmission signal from the synthesization device 10 to the fourth terminal unit, and a change-over switch 137.

The operation of the arrangement shown in FIGS. 2A and 2B will be described below. Video signal processing will be described first.

In this embodiment, in starting the system, the camera units of the respective terminal units are synchronously operated first by using a reference sync. signal generated by a sync. signal generator 173 (see FIG. 3 to be described later) in the multiimage synthesization circuit 104. That is, a reference sync. signal output from the sync. signal generator 173 (see FIG. 3 to be described later) in the multiimage synthesization circuit 104 is transmitted as a transmission signal to each of the four terminal units through the change-over switch 137, the adder 111, the 75 Ω drive amplifiers 112, 121, 128, and 135, and the transmission signal transmission terminals 113, 122, 129, and 136.

The transmission signals transmitted in the above manner are respectively supplied to the terminal units through the coaxial cables as the communication lines. For example, the transmission signal is applied to the transmission signal reception terminal 37 of the first terminal unit, and a multiimage synthetic signal component is separated from the transmission signal received through the transmission signal reception terminal 37 by the low-pass filter 36 whose cutoff frequency is set to 4.2 MHz. Horizontal and vertical sync. signals, as reference sync. signals generated by the sync. signal generator 173 in the multiimage synthesization circuit 104 in the above manner, are separated from the separated multiimage synthetic signal component by the sync. signal separation circuit 35. When various sync. signal generating operations in the SSG 20 are reset by using the separated horizontal and vertical sync. signals, the camera unit of the first terminal unit operates in synchronism with a reference sync. signal output from the sync. signal generator 173 in the multiimage synthesization circuit 104.

Such a synchronizing operation for the camera unit of the first terminal unit is also performed with respect to the second to fourth terminal units. In the above manner, the camera units of the first to fourth terminal units operate in synchronism with the reference sync. signal output from the multiimage synthesization circuit 104 of the synthesization device 10.

Various sync. signals including horizontal and vertical sync. signals and generated by each of the sync. signal generators 20 which are synchronously operated by the reference sync. signals are supplied to the timing pulse generator 19, the S/H circuit 16, the camera process circuit 17, and the NTSC encoder 18. The image pickup element 15 is then driven by various timing pulses generated by the timing pulse generator 19. With this operation, an electrical (video) signal corresponding to a participant image formed on the imaging plane of the image pickup element 15 is output from the image pickup element 15 through the image pickup optical lens 14.

The video signal output from the terminal unit 1 is sampled/held by the sample/hold circuit 16 on the next stage on the basis of, e.g., a correlation double sampling method. In the camera process circuit 17, the video signal supplied from the sample/hold circuit 16 is subjected to various camera signal processes such as a color separation process corresponding to an on-chip color filter placed on the imaging plane of the image pickup element 15 and γ conversion. As a result, a luminance signal (Y) and color difference signals (R-Y and B-Y) are formed and output.

The luminance signal and color difference signals formed by the camera process circuit 17 in the above manner are supplied to the NTSC encoder 18. The NTSC encoder 18 forms a composite color video signal conforming to, e.g., the NTSC color television scheme by using the supplied luminance signal and color difference signals. The adder 22 adds an audio FM signal output from the audio FM demodulator 26 in the manner described later to the composite color video signal. The resultant signal is sent to the transmission signal reception terminal 107 of the synthesization device 10 through the 75 Ω drive amplifier 23 and the transmission signal transmission terminal 32.

With a similar operation, a composite color video signal to which an audio FM signal is added, similar to the above signal, is sent from each of the second to fourth terminal units to a corresponding one of the transmission signal reception terminals 118, 125, and 134.

Subsequently, only the composite color video signal components are separated by the low-pass filters 106, 117, 124, and 131, each having a cutoff frequency set to, e.g., 4.2 MHz from the composite color video signals to which the audio FM signals supplied to the synthesization device 10 through the transmission signal reception terminals 107, 118, 125, and 134 in the above manner are added. The separated composite color video signals are sent to the NTSC decoders 105, 116, 123, and 130, in which the signals are separated into luminance signal components (Y) and color difference signal components (R-Y and B-Y), respectively. Thereafter, these signals are sent to the multiimage synthesization circuit 104 in units of components.

Figure 3:
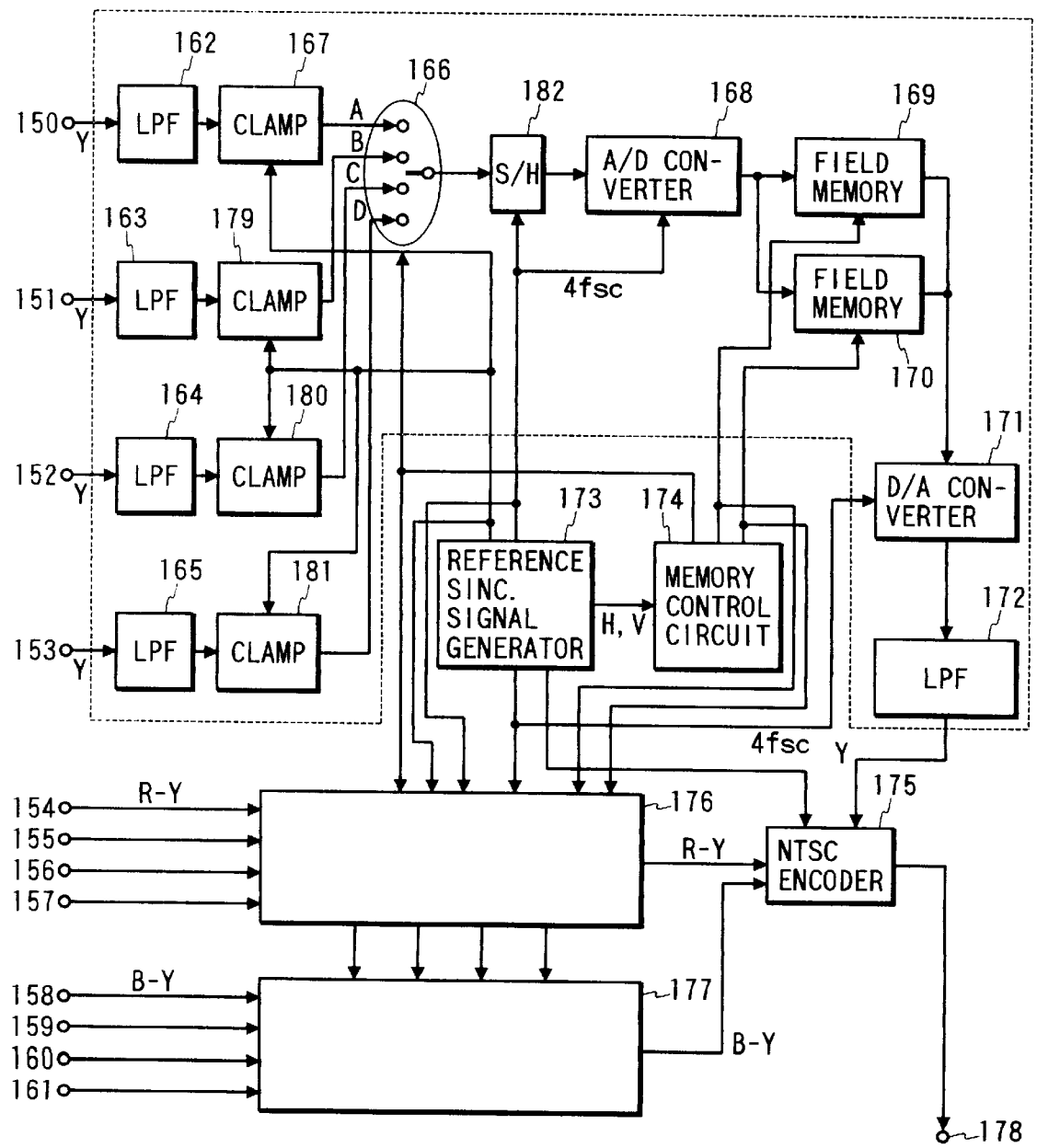
FIG. 3 is a block diagram showing the detailed arrangement of a multiimage synthesization circuit in FIGS. 2A and 2B.
Figure 4:
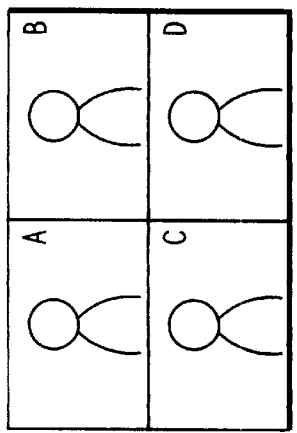
FIG. 4 is a view showing an example of multiimage display in the present invention.

The multiimage synthesization circuit 104 in FIGS. 2A and 2B forms a multiimage synthetic signal for performing multiimage display of moving images of the participants who are operating the respective terminal units, which images correspond to the composite color video signals respectively supplied from the first to fourth terminal units, as shown in FIG. 4. FIG. 3 shows the detailed arrangement of the multiimage synthesization circuit 104.

Referring to FIG. 3, the multiimage synthesization circuit 104 includes luminance signal input terminals 150 to 153 to which luminance signal components output from the NTSC decoders 105, 116, 123, and 130 are respectively supplied, R-Y signal input terminals 154 to 157, B-Y signal input terminals 158 to 161, a change-over switch 166, clamp circuits 167, 179, 180, and 181, a sample/hold circuit 182, an A/D converter 168, field memories 169 and 170, a digital/analog (D/A) converter 171, a low-pass filter 172 for removing a clock signal component from a signal output from the D/A converter 171, a sync. signal generator 173, a memory control circuit 174, an NTSC encoder 175, circuit blocks 176 and 177 having the same functions as the circuit arrangements indicated by the dotted line frames in FIG. 3, and a multiimage synthetic signal output terminal 178.

Low-pass filters 162 to 165 in FIG. 3 serve to suppress high-frequency components before A/D conversion performed by the analog/digital (A/D) converter 168 on the next stage to prevent occurrence of aliasing noise. The cutoff frequency of each low-pass filter is set to, e.g., 3 MHz.

In this embodiment, when an image corresponding to a composite color video signal supplied from each terminal unit through the change-over switch 166 is to be displayed on the display screen of a monitor apparatus in the manner described later in full size, the A/D converter 168 in FIG. 3 performs A/D conversion by using a sampling frequency 4 fsc (fsc represents a color subcarrier frequency, which is set to 3.579545 MHz when a composite color video signal corresponds to the NTSC color television scheme). Assume that images corresponding to composite color video signals supplied from the respective terminal units are reduced in size, and the four reduced images are synthesized as shown in FIG. 4 to be displayed as a four-window multiimage on the display screen of a monitor apparatus. In this case, the A/D converter 168 performs A/D conversion by using a sampling frequency 2 fsc. The Nyquist frequency is fsc. In order to prevent occurrence of aliasing noise in the above A/C conversion, the frequency band of each signal must be limited by each low-pass filter for removing aliasing noise, whose cutoff frequency is set to about 3.58 MHz, before A/D conversion.

The operation of the multiimage synthesization circuit 104 will be described below with reference to the arrangement in FIG. 3.

Processing of luminance signals will be described first. As described above, the luminance signals of the four systems, which are respectively supplied from the NTSC decoders 105, 116, 123, and 130 in FIGS. 2A and 2B, are respectively supplied to the clamp circuits 167, 179, 180, and 181 through low-pass filters 162 to 165. After the signals are subjected to clamp processing in the clamp circuits 167, 179, 180, and 181 in accordance with a clamp pulse supplied from the sync. signal generator 173, the resultant signals are output to the sample/hold circuit 182 on the next stage through the change-over switch 166 upon a switching operation based on the switching logic for the switch in FIG. 5.

As described above, the clamp circuits 167, 179, 180, and 181 perform clamp operations in synchronism with the same clamp pulse output from the sync. signal generator 173. This is because all the camera units of the first to fourth terminal units are controlled to operate in synchronism with horizontal and vertical sync. signals generated by the sync. signal generator 173 in FIG. 3 in the early stage of the operation of the system, as described above.

Figure 5:
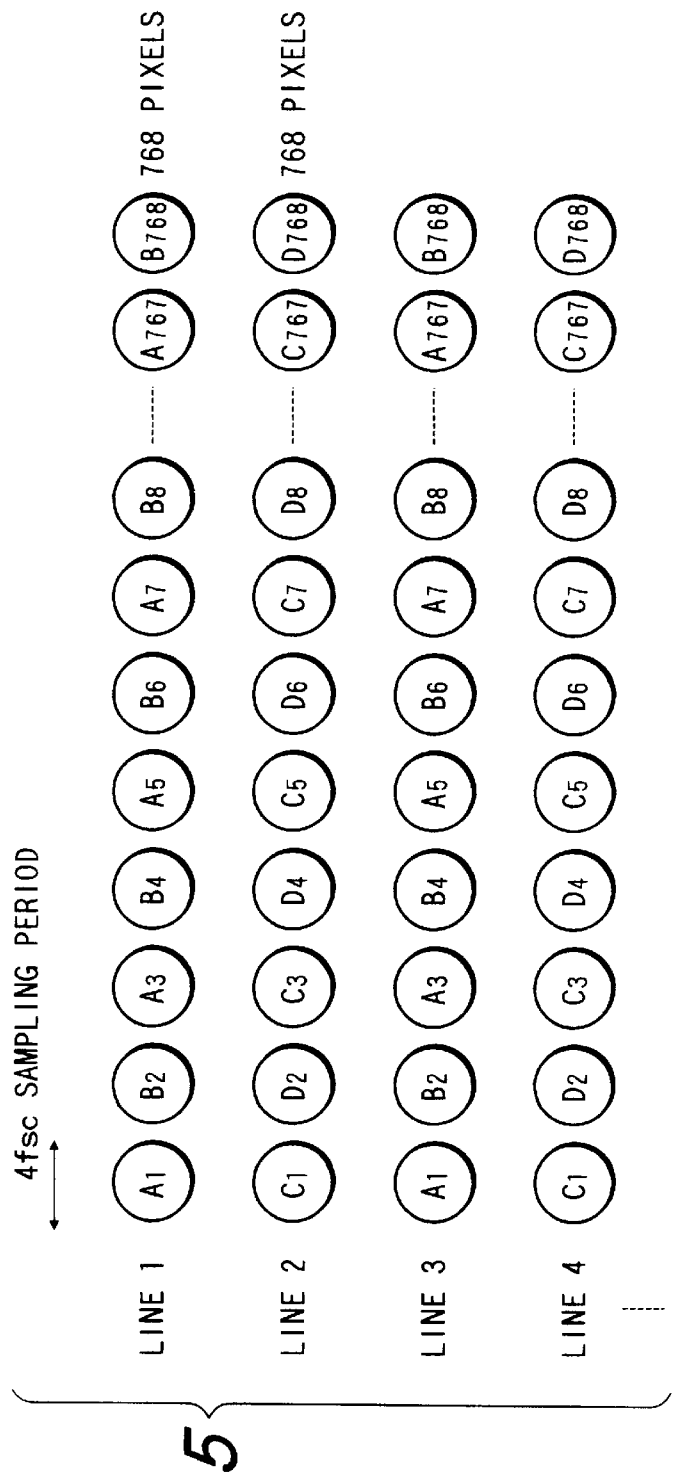
FIG. 5 is a view showing switching logic in an changeover switch 166 in the multiimage synthesization circuit in FIG. 3.

As shown in FIG. 5, according to the switching logic for the change-over switch 166, in sampling luminance signals according to the sampling frequency 4 fsc, contacts A and B are alternately connected for each sampling period during each odd-numbered horizontal scanning period (each odd-numbered horizontal scanning period in the first field), and contacts C and D are alternately connected for each sampling period during each even-numbered horizontal scanning period (each even-numbered horizontal scanning period in the first field).

A luminance signal output from the change-over switch 166 whose switching operation is controlled in the above manner is sampled/held by the sample/hold circuit 182 which operates in accordance with a sample/hold pulse output from the sync. signal generator 173, thereby removing unwanted noise (noise produced upon switching operation of the change-over switch 166) from the signal. The resultant signal is supplied to the A/D converter 168.

The signal is then converted into a digital signal by the A/D converter 168 in accordance with the sampling frequency 4 fsc, and is supplied to the first field memory 169.

Figure 6:
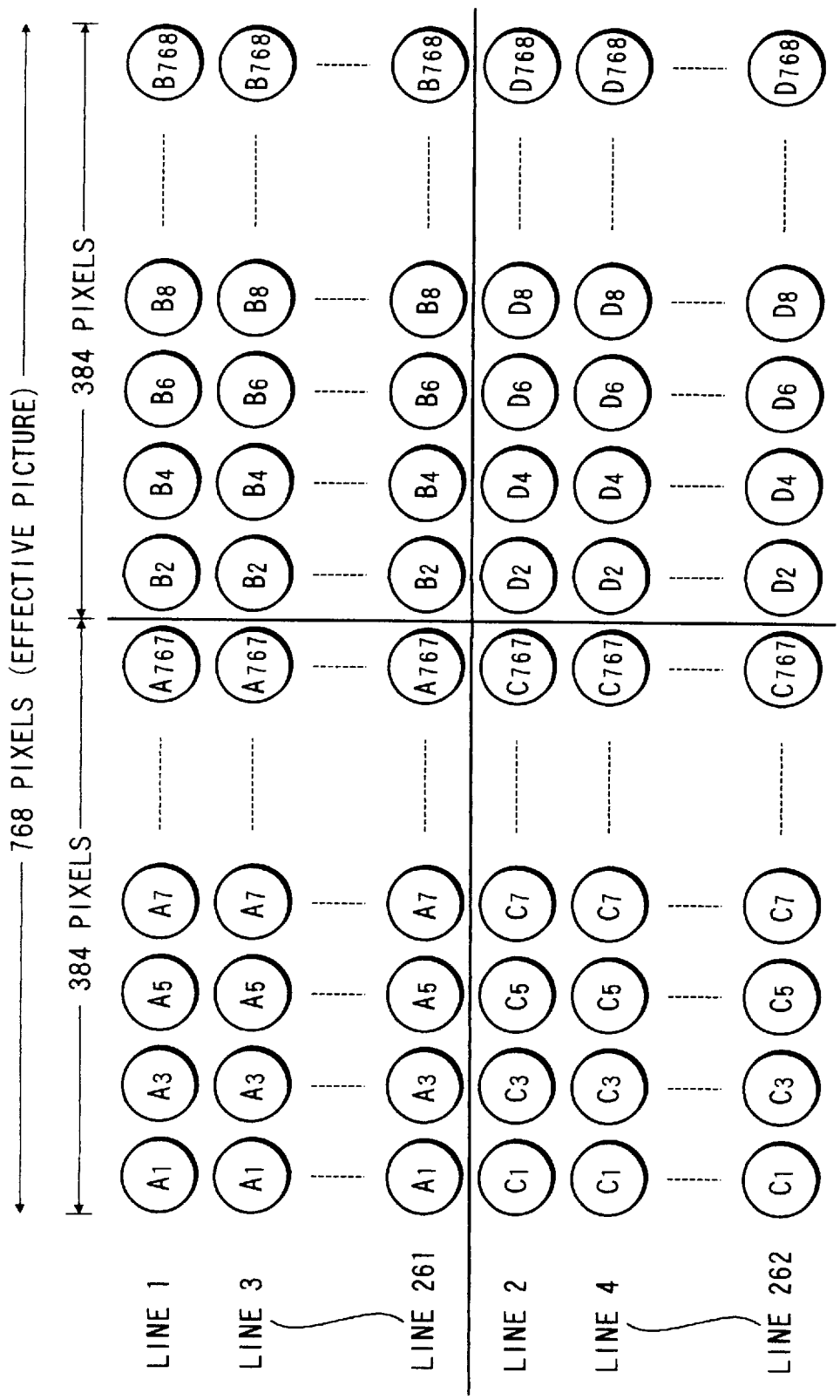
FIG. 6 is a view visually showing sampled data to be written in the memory areas of a first field memory in FIG. 3.

FIG. 6 visually shows sampled data to be written in the memory areas of the field memories 169 and 170 in FIG. 3 to explain address control performed by the memory control circuit 174 in writing/reading the sampled data of a luminance signal in/from the field memories 169 and 170. Sampled data write and read operations with respect to each field memory will be described below with reference to FIG. 6.

The memory control circuit 174 performs address control in writing sampled data in the first field memory 169 as follows. As shown in FIG. 6, the entire memory area is divided into four areas. At sampling point A in FIG. 5, sampled data of the luminance signal are sequentially written in the ¼ memory area at the upper left position in FIG. 6 in the order of the input of the sampled data. At sampling point B in FIG. 5, sampled data of the luminance signal are sequentially written in the ¼ memory area at the upper right position in FIG. 6 in the order of the input of the sampled data. Similarly, at sampling points C and D in FIG. 5, sampled data of the luminance signal are sequentially written in the ¼ memory areas at the lower left position and the lower right position in FIG. 6, respectively, in the order of the input of the sampled data.

Figure 7:
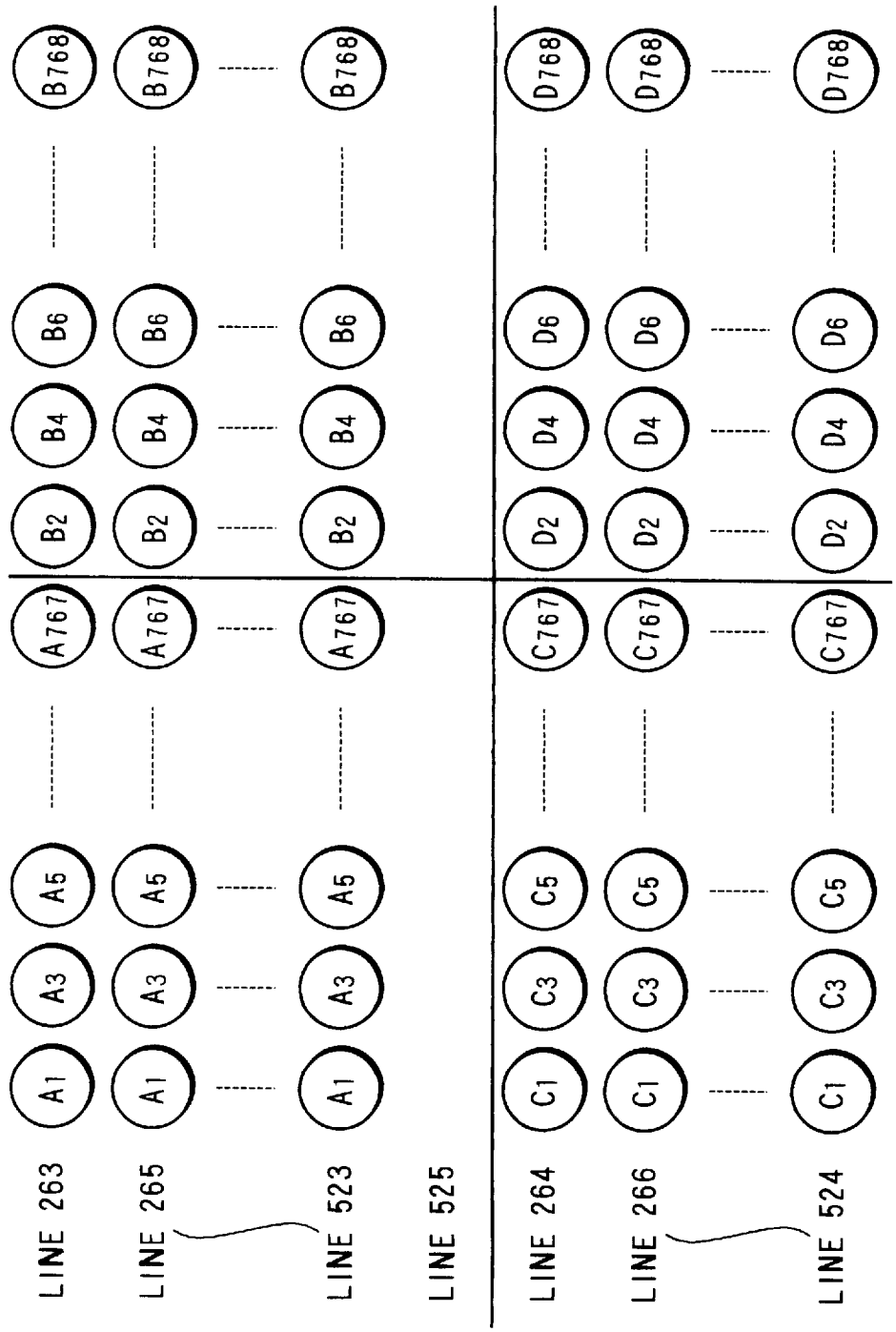
FIG. 7 is a view visually showing sampled data to be written in the memory areas of a second field memory in FIG. 3.

When the sampled data write operation with respect to the first field memory 169 is completed after one field period, the write mode is switched to the read mode of reading out the written sampled data from the first field memory 169 in accordance with an instruction from the memory control circuit 174. The memory control circuit 174 then performs address control for the first field memory 169, in which the sampled data are written, in accordance with an order corresponding to the order of the respective horizontal scanning lines, thereby reading out the sampled data written in the first field memory 169. At the same time, a sampled data write operation with respect to the second field memory 170 is started. The sampled data are written in the second field memory 170 in the same manner as in the first field memory 169. When the sampled data write operation with respect to the second field memory 170 is completed after one field period as shown in FIG. 7, the write mode is switched to the read mode of reading out the written sampled data from the second field memory 170. The sampled data are then read out from the second field memory 170 in the same manner as in the first field memory 169. At the same time, a sampled data write operation with respect to the first field memory 169, from which the sampled data have been read out, is started again. Thereafter, sampled data write and read operations with respect to the first and second field memories 169 and 170 are alternately and repeatedly performed. As a result, the sampled data corresponding to the multiimage synthetic luminance signal like the one shown in FIG. 4 are supplied to the D/A converter 171 on the next stage.

In the above embodiment, in writing sampled data in a field memory, the address control described with reference to FIGS. 6 and 7 is performed, whereas in a read operation, address control is performed for the field memory, in which the sampled data are written, in accordance with the order corresponding to the order of the respective horizontal scanning lines to read out the sampled data. However, for example, in a write operation, sampled data like those shown in FIG. 5, which are output from the change-over switch 166, may be directly written in a field memory, and address control equivalent to that described with reference to FIGS. 6 and 7 may be performed in a read operation to read out the sampled data written in the field memory. With this operation as well, a multiimage synthetic luminance signal can be formed.

Multiimage synthetic luminance signal components alternately output from the field memories 169 and 170 for each field period are alternately supplied to the D/A converter 171 in units of fields. The signal is then converted into an analog signal, and a clock signal component is removed therefrom by the low-pass filter 172. The resultant signal is supplied to the NTSC encoder 175.

Meanwhile, the R-Y and B-Y signals are subjected to processing similar to the above processing of the luminance signal in the circuit blocks 176 and 177 in FIG. 3. As a result, the multiimage synthetic R-Y and B-Y signals are respectively output from the circuit blocks 176 and 177 and supplied to the NTSC encoder 175.

The NTSC encoder 175 forms a multiimage synthetic composite color video signal from the multiimage synthetic luminance signal, the multiimage synthetic R-Y signal, and the multiimage synthetic B-Y signal, which are formed in the above manner, and the horizontal and vertical sync. signals supplied from the sync. signal generator 173. This signal is then output from the multiimage synthetic signal output terminal 178. The operation of the multiimage synthesization circuit 104 has been described above.

As shown in FIG. 2B, the multiimage synthetic composite color video signal output from the multiimage synthesization circuit 104 is supplied to the change-over switch 137, to which a video signal transmitted from the other party in the video conference is supplied from the codec 12 in FIG. 1 through the video signal reception terminal 100. By selectively switching the connection of the change-over switch 137 using, e.g., a keyboard or mouse for a PC, a multiimage synthetic composite color video signal formed by performing multiimage synthesis of video signals transmitted from the four home terminal units using the multiimage synthesization circuit 104, and a multiimage synthetic composite color video signal formed by performing multiimage synthesis of video signals transmitted from the four distant terminal units using the multiimage synthesization circuit can be selectively output to the adder 111 on the next stage.

The multiimage synthetic composite color video signal output from the multiimage synthesization circuit 104 is also transmitted to the codec 12 in FIG. 1 through the 75 Ω drive amplifier 110 and the video signal transmission terminal 102. This signal is coded by the codec 12. Thereafter, the coded signal is also transmitted to the other party through the I/F 13 for a digital line and the ISDN.

The multiimage synthetic composite color video signal output from the change-over switch 137 in the above manner is added to the audio FM signal supplied from the audio FM modulator 114 in the above manner by the adder 111. The resultant transmission signal is then transmitted to the respective terminal units and supplied to their transmission signal reception terminals (see the transmission signal reception terminal 37 in FIG. 2A) through the 75 Ω drive amplifiers 112, 121, 128, and 135 and the transmission signal transmission terminals 113, 122, 129, and 136.

Referring to FIG. 2A, only the multiimage synthetic composite color video signal component is extracted from the multiimage synthetic composite color video signal having the audio FM signal added thereto and supplied to the transmission signal reception terminal 37 by the low-pass filter 36 whose cutoff frequency is set to 4.2 MHz. The resultant signal is supplied to a dedicated monitor apparatus or the video overlay board of a PC (not shown) through the 75 Ω drive amplifier 34 and the video signal output terminal 33. In the former case, a multiimage corresponding to the multiimage synthetic composite color video signal is directly displayed on the display screen of the monitor apparatus. In the latter case, a multiimage corresponding to the multiimage synthetic composite color video signal is displayed in the windows of the display screen of the display monitor -apparatus of the PC in an overlay form. With this operation, the video signals transmitted from the four home or distant terminal units can be displayed as a multiimage on each terminal unit.

Audio signal processing will be described next.

Referring to FIG. 2A, a microphone (not shown) is connected to the audio signal input terminal 24. For example, speech from the participant who is operating the first terminal unit is converted into an electrical signal by the microphone. This signal is output as an audio signal and supplied to the audio FM demodulator 26 through the audio signal input terminal 24 after it is amplified by the amplifier 25.

The audio FM demodulator 26 forms an audio FM signal by FM-modulating the supplied audio signal into a signal in a narrow frequency band having a center frequency of 4.5 MHz. The formed audio FM signal is added to the composite color video signal supplied from the NTSC encoder 18 in the above manner by the adder 22. The resultant signal is output to the synthesization device 10 through the 75 Ω drive amplifier 23 and the transmission signal transmission terminal 32.

Audio signal processing is also performed in the second to fourth terminal units in the same manner as in the first terminal unit. As a result, a composite color video signal to which an audio FM signal is added is output from each terminal unit and supplied to each of the transmission signal reception terminals 107, 118, 125, and 134 of the synthesization device 10.

Only the audio FM signal components are separated from the audio FM signals supplied from the respective terminal units through the transmission signal reception terminals 107, 118, 125, and 134 of the synthesization device 10 by the bandpass filters 109, 120, 127, and 133 for audio signals in a frequency band whose center frequency is set to, e.g., 4.5 MHz. The separated audio FM signals are FM-demodulated by the audio FM demodulators 108, 119, 126, and 132. The resultant signals are then sent to the audio synthesization circuit 115.

Figure 8:
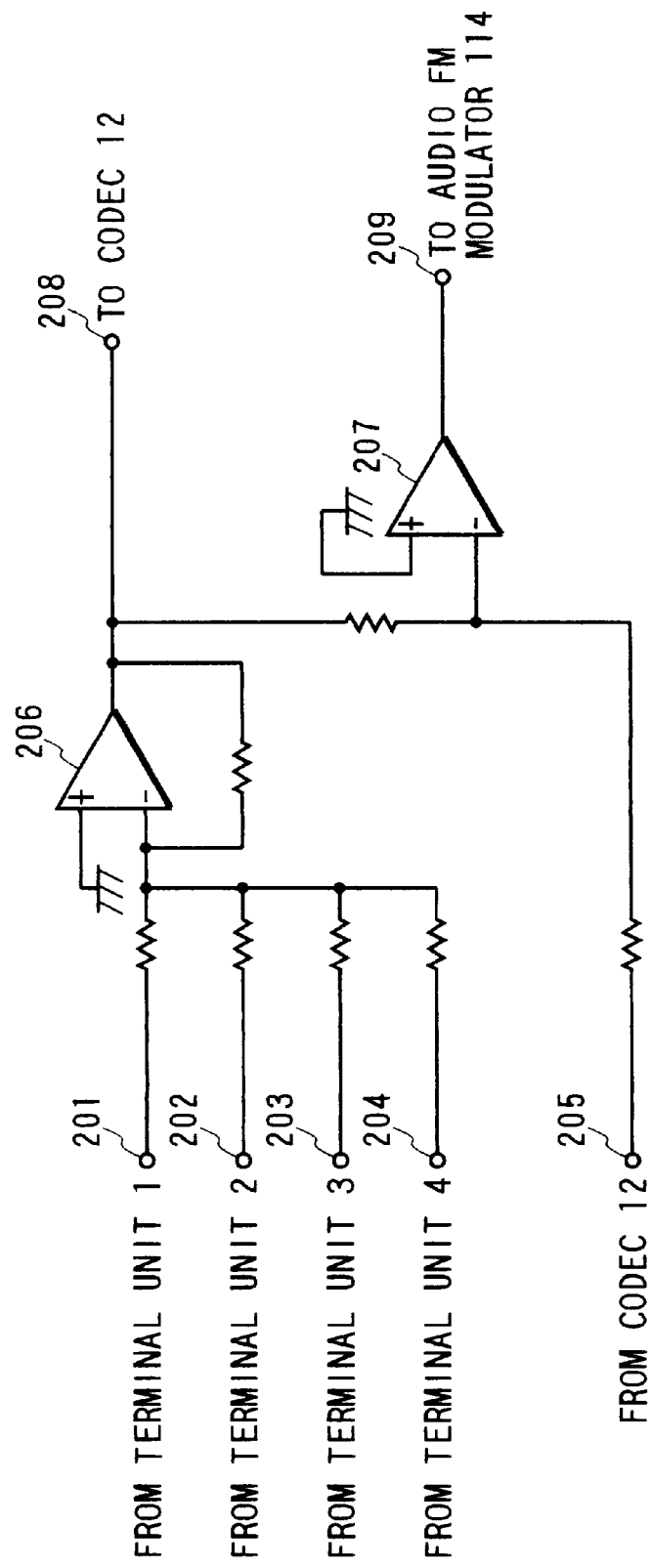
FIG. 8 is a block diagram showing the detailed arrangement of an audio synthesization circuit in FIGS. 2A and 2B.

The audio synthesization circuit 115 in FIG. 2B has an arrangement like the one shown in FIG. 8.

As shown in FIG. 8, the audio synthesization circuit 115 consists of operational amplifiers 206 and 207. Audio signals transmitted from the first to fourth home terminal units are input through input terminals 201 to 204, and an audio signal transmitted from the other party in the video conference is input from the codec 12 in FIG. 1 through an input terminal 205. The audio signals respectively transmitted from the first to fourth terminal units and the audio synthetic signal formed by synthesizing the audio signals transmitted from the four distant terminal units using the audio synthesization circuit are fully added by the operational amplifier 207. The resultant signal is output as an audio synthetic signal from an output terminal 209 to the audio FM modulator 114 shown in FIG. 2B. In addition, the audio signals transmitted from the first to fourth terminal units are added by the operational amplifier 206. The resultant signal is transmitted to the codec 12 in FIG. 1 through an output terminal 208 and the audio signal transmission terminal 103. The signal is coded by the codec 12. The coded signal is also transmitted to the other party through the I/F 13 and the ISDN.

The audio synthetic signal output from the output terminal 209 of the audio synthesization circuit 115 is FM-modulated into a signal in a narrow frequency band having a center frequency of, e.g., 4.5 MHz by the audio FM modulator 114. The resultant signal is supplied as an audio synthetic FM signal to the adder 111. The adder 111 adds this signal to the multiimage synthetic color video signal supplied from the multiimage synthesization circuit 104 in the above manner, thereby forming a transmission signal. The signal is then transmitted to the respective terminal units through the 75 Ω drive amplifiers 112, 121, 128, and 135 and the transmission signal transmission terminals 113, 122, 129, and 136 and is supplied to the transmission signal reception terminals (see the transmission signal reception terminal 37 in FIG. 2A) of the respective terminal units.

Referring to FIG. 2A, for example, only the audio synthetic FM signal component is separated from the multiimage synthetic color video signal having the audio FM signal added thereto and supplied to the transmission signal reception terminal 37 of the first terminal unit by the bandpass filter 31 whose center frequency is set to 4.5 MHz. The separated audio synthetic FM signal is FM-demodulated by the audio FM demodulator 30. The resultant signal is sent to the subtracter 29.

An audio signal output from the microphone, which is generated when the microphone picks up speech from the participant who is operating the first terminal unit, is supplied to the subtracter 29. The subtracter 29 subtracts the audio signal generated by the microphone of the first terminal unit from the audio synthetic signal (i.e., the signal obtained by adding/synthesizing the audio signals transmitted from the first to fourth home terminal units and the audio signals transmitted from the other party) supplied from the audio FM demodulator 30, thereby canceling the audio signal transmitted from the first terminal unit itself.

Similarly, in the second to fourth terminal units, the audio signals transmitted from the terminal units themselves are canceled by the respective subtracters.

The audio synthetic signal output from the subtracter 29 is amplified by the amplifier 28 for amplifying an output audio signal. The amplified signal is output through the audio signal output terminal 27. The audio synthetic signal output from the audio signal output terminal 27 is supplied to a dedicated monitor apparatus or the audio process board of a PC (not shown). In the former case, the speech is reproduced by the speaker of the monitor apparatus. In the latter case, the speech is reproduced by the speaker unit of the PC through the audio process board. With this operation, a given participant can reproduce and check the speech corresponding to the audio signals respectively transmitted from all the terminal units, except for his/her own terminal unit, in the video conference (e.g., the participant at the first terminal unit can reproduce and check speech obtained by adding/synthesizing the speech from the participants at the second to fourth home terminal units and the speech from the participants at the four distant terminal units).

Another embodiment of a terminal unit in this video communication system will be described below with reference to FIGS. 9 and 10.

Figure 9:
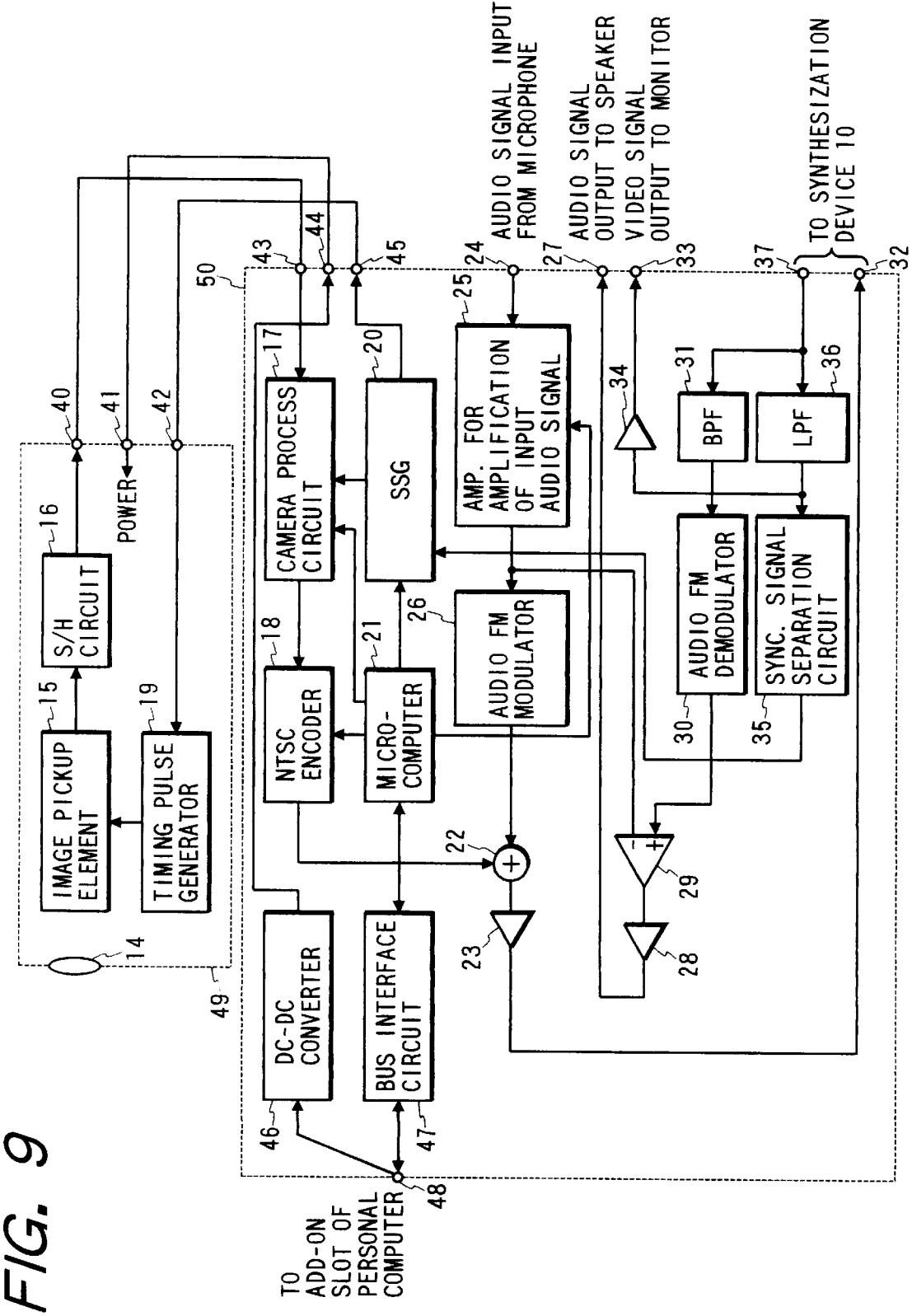
FIG. 9 is a block diagram showing a case wherein a terminal unit in this video communication system is realized as an expansion board designed to be directly mounted in an expansion slot of a personal computer so as to be incorporated therein.

FIG. 9 shows a case wherein a terminal unit in this video communication system is realized as an expansion board designed to be directly loaded into an expansion slot of a PC so as to be incorporated in the PC. The same reference numerals in FIG. 9 denote the same constituent elements as in FIGS. 2A and 2B, and a description thereof will be omitted.

Referring to FIG. 9, this terminal unit includes a video signal output terminal 40 of a camera head unit, a power input terminal 41 of the camera head unit, a sync. signal input terminal 42 of the camera head unit, a video signal input terminal 43 of an expansion board unit, a power output terminal 44 of the expansion board unit, a sync. signal output terminal 45 of the expansion board unit, a DC-DC converter 46 for forming a predetermined DC voltage required to drive the circuit of the camera head unit from DC power supplied from the PC through the expansion slot of the PC, a bus interface circuit 47 between the microcomputer of the terminal unit and the expansion slot of the PC, an expansion board I/O terminal 48 for connecting the expansion board unit to the expansion slot, a camera head unit 49 in this embodiment, and an expansion board unit 50 in the embodiment, which is connected to the camera head unit 49 through a predetermined cable.

In this embodiment, the camera head unit of the terminal unit is separately formed. For example, the camera head unit is designed to be mounted on a display monitor apparatus for a PC. With this arrangement, a reduction in size is attained. In addition, portions other than the camera head unit are mounted on the expansion board to be loaded into an expansion slot of a PC. An image display operation, reproduction of speech, and the operation of the system are performed by using the display monitor apparatus for the PC, the keyboard of the PC, and the like.

In this embodiment, as an expansion board unit for a PC, a unit which can be connected to various buses, e.g., an ISA-bus, an EISA-bus, a PCI-bus, and Nu-bus for desktop computers is assumed to be used. However, an expansion board unit which can be connected to an IC card interface slot of a laptop or notebook computer may be used.

Figure 10:
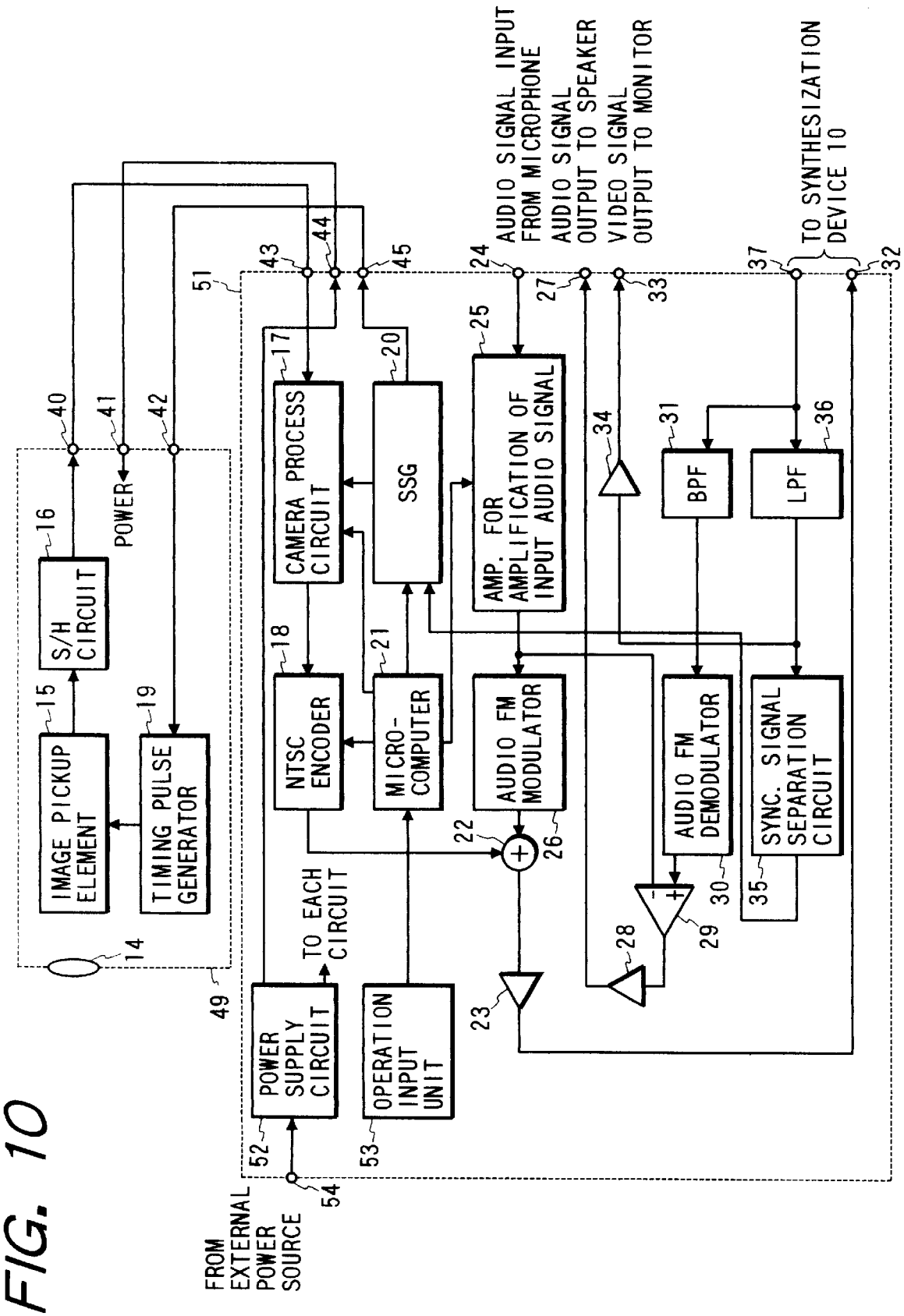
FIG. 10 is a block diagram showing a case wherein a terminal unit in this video communication system is realized as a terminal adaptor unit without using a personal computer.

FIG. 10 shows a case wherein a terminal unit in this video communication system is realized as a terminal adaptor unit which is constituted by a camera head unit and an adaptor unit as separate units. In this case, a PC is not used unlike in the embodiment shown in FIG. 9, and the adaptor unit includes a dedicated operation unit, a microphone connection terminal, a television monitor apparatus connection terminal, and the like. The same reference numerals in FIG. 10 denote the same constituent elements as in FIGS. 2A, 2B and 9, and a description thereof will be omitted.

Referring to FIG. 10, this terminal unit includes a terminal adapter body 51, a power supply circuit 52 for supplying power to the camera head unit and the respective portions in the terminal adaptor unit body, an operation input unit 53, and an external power input terminal 54.

In this embodiment, the camera head unit of the terminal unit is separately formed and designed to be mounted in, e.g., a dedicated television monitor apparatus. With this arrangement, a reduction in size is attained. In addition, portions other than the camera head unit are stored in a housing as an adaptor unit body. An image display operation and reproduction of speech are performed by using a dedicated television monitor connected to the adaptor unit, and the operation of the system is performed by using a dedicated operation unit mounted on the adaptor unit, a remote control unit (not shown), and the like. This arrangement is suitable for a user who is not familiar with the operation of the keyboard of a PC, a mouse, and the like, and has good portability.

As described above, according to the video communication system as the first embodiment of the present invention, each participant performs multiimage processing and audio synthesis with respect to images and speech of a plurality of participants in a video conference by using his/her own terminal unit to multiplex and transmit the video and audio signals. With this operation, an on-seat type video conference can be held by a plurality of participants of one party and a plurality of participant of the other party, which requires no movement of the participants to a conference room or the like and hence can prevent various time losses.

When a video conference is to be held by using this system through an ISDN, the terminal units of two groups of participants on the respective sides connected through a coaxial cable. For this reason, the number of lines to be used in the ISDN is the number of lines required to connect the groups of the participants on the respective sides in the video conference (one in this embodiment). The line charge can therefore be saved.

When video signals are asynchronously transmitted from terminal units, the capacity of a memory used for multiimage synthesis increases with an increase in the number of terminal units to be connected. The cost for realizing the system is therefore very high. In the system of this embodiment, however, since the camera unit of each terminal unit is designed to operate in synchronism with a reference sync. signal transmitted from the synthesization device, a video signal is transmitted from each terminal unit at a predetermined timing. For this reason, an increase in the capacity of the memory used for multiimage synthesis can be suppressed, and hence the system can be realized at a low cost.

The second embodiment of the present invention will be described next.

Figure 11B:
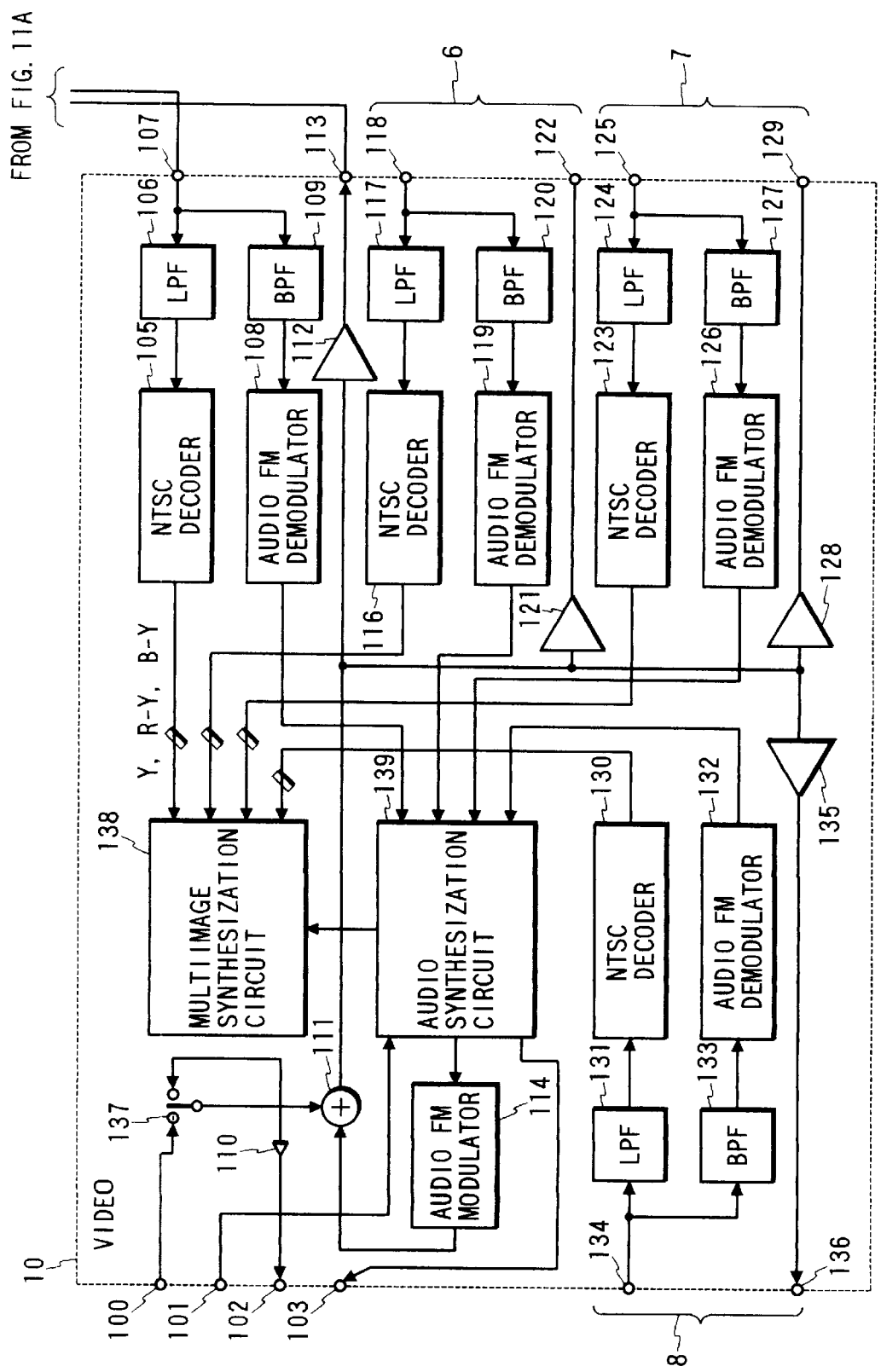
FIG. 11 is comprised of FIGS. 11A and 11B illustrating block diagrams showing the overall arrangement of a video communication system as the second embodiment of the present invention.
Figure 12:
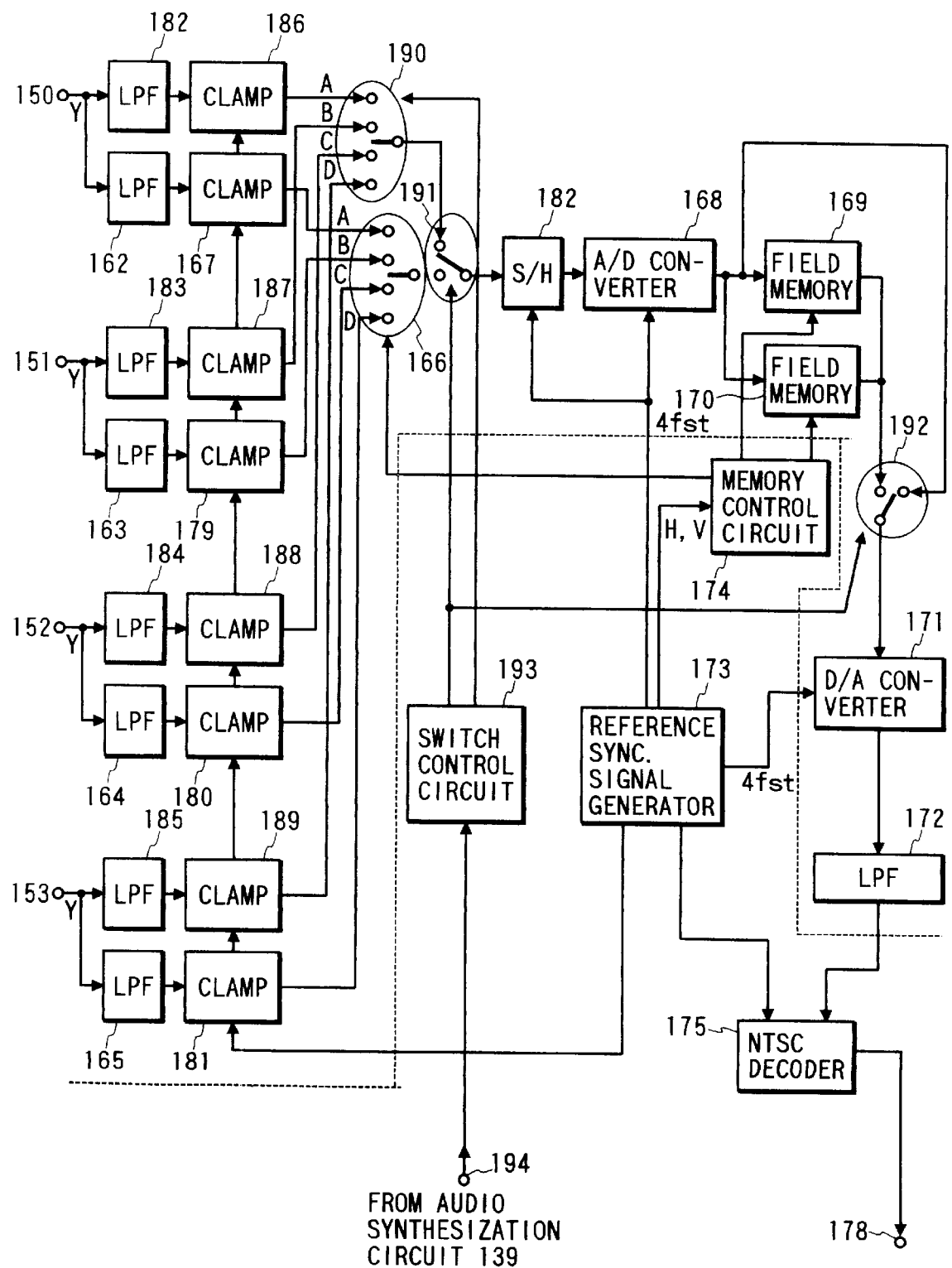
FIG. 12 is a block diagram showing the arrangement of a multiimage synthesization circuit in the second embodiment of the present invention.
Figure 13:
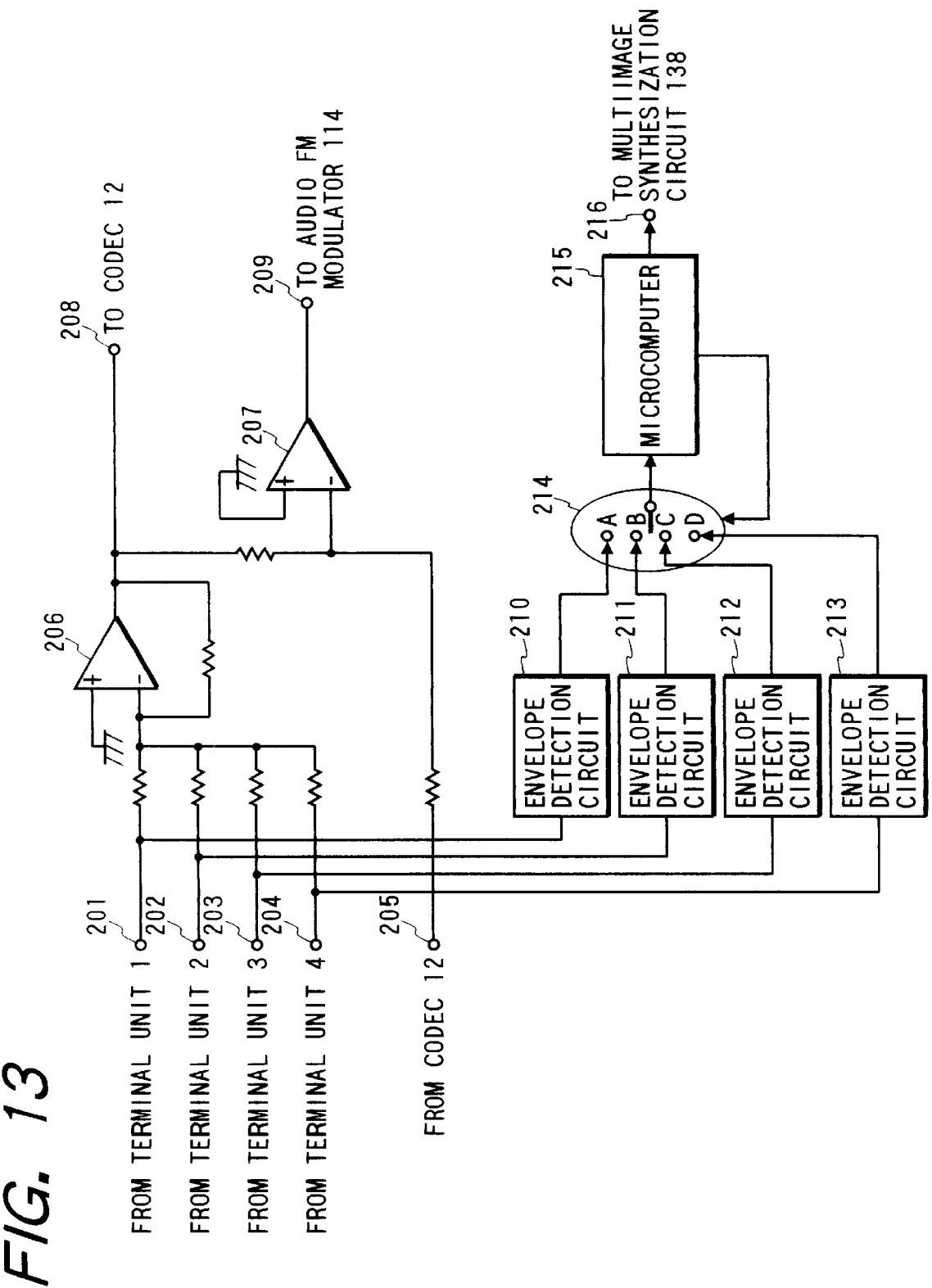
FIG. 13 is a block diagram showing the arrangement of an audio synthesization circuit in the second embodiment of the present invention.

FIGS. 11A and 11B show the overall arrangements of a video communication system according to the second embodiment of the present invention. FIG. 12 is a block diagram showing the arrangement of a multiimage synthesization circuit in FIGS. 11A and 11B. FIG. 13 is a block diagram showing the arrangement of an audio synthesization circuit in FIGS. 11A and 11B. The same reference numerals in FIGS. 11A to 13 denote the same constituent elements as in FIGS. 2A, 2B, 3, and 8, and a description thereof will be omitted.

In this embodiment, a function of detecting a speaker of a plurality of participants in a video conference and automatically enlarging and displaying an image of the speaker is added to the video communication system for an on-seat type video conference held by a plurality of participants of one party and a plurality of participants of the other party.

As shown in FIG. 11B, this embodiment is different from the first embodiment in that a speaker detection signal detected by and output from a detection circuit in an audio synthesization circuit 139 is sent to a multiimage synthesization circuit 138 to control the multiimage synthesizing operation of the multiimage synthesization circuit 138 so as to enlarge and display an image of the speaker.

The arrangements of the multiimage synthesization circuit and the audio synthesization circuit in this embodiment will be described next with reference to FIGS. 12 and 13.

FIG. 12 is a block diagram showing the arrangement of the multiimage synthesization circuit of this embodiment. Referring to FIG. 12, this circuit includes low-pass filters 182 to 185 for suppressing high-frequency components before A/D conversion performed by an A/D converter 168 to prevent occurrence of aliasing noise in the A/D conversion. The cutoff frequency of each filter is set to be, e.g., 6 MHz.

In this embodiment, when an image corresponding to a composite color television signal supplied from each terminal unit is to be displayed on the display screen of a monitor apparatus in full size, as will be described later, the A/D converter 168 performs A/D conversion by using a sampling frequency 4 fsc. In this case, the Nyquist frequency is represented by 2 fsc (7.16 MHz when the composite color video signal corresponds to the NTSC color television scheme). In order to prevent occurrence of aliasing noise in the A/D conversion, the frequency band must be limited before the A/D conversion by each low-pass filter whose cutoff frequency is set to 7.16 MHz or less.

Referring to FIG. 12, the multiimage synthesization circuit includes clamp circuits 186 to 189 and a change-over switch 190, whose switching control is performed to selectively switch and connect one of contacts A, B, C, and D in FIG. 12 in accordance with an instruction from a switch control circuit 193 (to be described later), unlike the switching control of the change-over switch 166 in FIG. 5, which is performed in accordance with the sampling clock 4 fsc.

This circuit also includes change-over switches 191 and 192. A connecting operation is controlled in accordance with an instruction from the switch control circuit 193 (to be described later) as follows. While no speaker is present in a plurality of participants in a video conference, the change-over switch 191 is switched to the contact on the change-over switch 166 side to perform multiimage display of images of the participants. At the same time, field memories 169 and 170 are connected to the D/A converter 171 through the change-over switch 192 to supply sampled data output from the A/D converter 168 to a D/A converter 171 through the field memories 169 and 170. While someone of the participants in the video conference is speaking, the change-over switch 191 is switched to the contact on the change-over switch 190 side to display an image of the speaker in full size. At the same time, the A/D converter 168 is directly connected to the D/A converter 171 through the change-over switch 192 to cause sampled data output from the A/D converter 168 to bypass the field memories 169 and 170.

The switch control circuit 193 controls the change-over switches 190 to 192 on the basis of a detection signal generated by the detection circuit in the audio synthesization circuit 139 and constituted by information associated with the presence/absence of a speaker and information for specifying the speaker if he/she is present (i.e., information indicating a specific one of four participants A to D). A detection signal input terminal 194 serves to input the above detection signal output from the detection circuit in the audio synthesization circuit 139.

Although FIG. 12 shows only the circuit for processing luminance signal components, the multiimage synthesization circuit in the second embodiment, similar to the multiimage synthesization circuit in the first embodiment, also includes a circuit for processing color difference signal components (i.e., R-Y and B-Y signal components). The arrangement and operation of this circuit are the same as those of the circuit for processing luminance signal components in FIG. 12. For this reason, the arrangement of the circuit for processing color difference signal components is not shown, and its operation will be omitted.

FIG. 13 is a block diagram showing the arrangement of the audio synthesization circuit in this embodiment. Referring to FIG. 13, this circuit includes envelope detection circuits 210 to 213 constituted by diodes, capacitors, resistors, and the like and adapted to detect the envelopes of audio signals, a change-over switch 214, a microcomputer 215 incorporating an A/D converter and serving to generate a detection signal constituted by information associated with the presence/absence of a speaker and information for specifying the speaker if he/she is present (i.e., information indicating a specific one of four participants A to D), and a detection signal output terminal 216 for outputting the detection signal output from the microcomputer 215.

The operation of the second embodiment of the present invention will be described below.

In this system, audio signals are transmitted from the first to fourth home terminal units to the audio synthesization circuit 139 in FIG. 13 through the input terminals 201 to 204 of the audio synthesization circuit. When someone of the four participants in the video conference starts to speak by using one of the first to fourth terminal units, a detection signal corresponding to the level of an audio signal corresponding to the speech from the speaker is generated by one of the envelope detection circuits 210 to 213 in FIG. 13.

The detection signal generated by one of the envelope detection circuits 210 to 213 is supplied to the change-over switch 214. The microcomputer 215 sequentially switches the change-over switch 214 at a predetermined period (e.g., in the order of (contacts) A→B→C→D→A . . . ) to receive the detection signal generated by one of the envelope detection circuits 210 to 213, and converts it into digital signal through the incorporated A/D converter. The microcomputer 215 then checks whether the level of the data has reached a predetermined level. With this operation, the microcomputer 215 monitors the generated state of a detection signal in each of the envelope detection circuits 210 to 213, and detects a specific one of the four participants in the video conference who has started to speak by using one of the first to fourth terminal units, thereby outputting a detection signal constituted by information associated with the presence/absence of a speaker and information for specifying the speaker if he/she is present (i.e., information indicating a specific one of four participants A to D) to the detection signal output terminal 216.

If, for example, a participant in the video conference starts to speak by using the third terminal unit, a detection signal corresponding to the level of an audio signal corresponding to the speech is supplied from the envelope detection circuit 212 to the change-over switch 214. By checking the level of the detection signal received through the change-over switch 214, the microcomputer 215 detects that a participant in the video conference has started to speak by using the third terminal unit. As a result, a detection signal indicating that participant C in the video conference has started to speak by using the third terminal unit is output from the microcomputer 215 to the multiimage synthesization circuit 138 through the detection signal output terminal 216.

The detection signal output from the detection signal output terminal 216 of the audio synthesization circuit 139 in FIG. 13 is input through the detection signal input terminal 194 of the multiimage synthesization circuit 138 shown in FIG. 12 and supplied to the switch control circuit 193.

As described above, the switch control circuit 193 performs the following switching control in accordance with the detection signal, supplied from the audio synthesization circuit 139, indicating that participant C in the video conference has started to speak by using the third terminal unit. The switch control circuit 193 switches the change-over switch 190 to contact C in FIG. 12 to supply a luminance signal transmitted from the third terminal unit and indicating an image of participant C to the sample/hold circuit 182. In addition, the switch control circuit 193 switches the change-over switch 191 from the contact on the change-over switch 166 side to the contact on the change-over switch 190 side, and also switches the change-over switch 192, which has been connecting the field memories 169 and 170 to the D/A converter 171, to directly connect the A/D converter 168 to the D/A converter 171, thereby causing the sampled data of the luminance signal indicating the image of participant C, which is output from the A/D converter 168, to bypass the field memories 169 and 170 so as to be directly supplied to the D/A converter 171. With this operation, the display screen of the monitor apparatus, on which images of the four participants in the video conference have been displayed as a multiimage, is switched to "full size display" of displaying the image of participant C on the screen in full size. In this manner, images of the participants are displayed as a multiimage while none of the participants in the video conference is speaking, and an image of a speaker is displayed in full size when he/she starts to speak.

According to the video communication system as the second embodiment of the present invention, while none of a plurality of participants in an on-seat type video conference is speaking, images of all the participants are displayed as a multiimage. When someone starts to speak, an image of the speaker is enlarged and displayed on the screen to allow the remaining participants to easily see an expression on the speaker and the movement of his/her mouth. The contents of the speech can therefore be communicated to the remaining participants more accurately.

As has been described above, according to this embodiment, there is provided a video communication system which can solve the conventional problems and realize an on-seat type multipoint video conference, at a low cost, which is held while a plurality of participants are sitting on seats, without making any preparations before the video conference, e.g., reservation of a conference room, movement to the conference room, and carrying of references.

What is claimed is:

1. A video communication system comprising:
   (A) a terminal unit for transmitting/receiving an information signal including video information; and
   (B) a repeater to which a plurality of terminal units each identical to said terminal unit can be connected, said repeater generating a reference sync. signal for causing the plurality of connected terminal units to synchronously generate the respective video information, supplying the generated reference sync. signal to each of the plurality of connected terminal units, forming a transmission signal to be transmitted to a transmission line by synthesizing the video information, respectively transmitted from the plurality of terminal units, synchronously with the reference sync. signal, and outputting the formed transmission signal to the transmission line.

2. A system according to claim 1, wherein the information signal includes audio information in addition to the video information.

3. A system according to claim 2, wherein said terminal unit includes:
   (a) video information input means for inputting video information to be transmitted;
   (b) audio information input means for inputting audio information to be transmitted; and
   (c) information signal forming means for forming an information signal by multiplexing the video information input by said video information input means and the audio information input by said audio information input means.

4. A system according to claim 3, wherein said video information input means includes:
   (a) image pickup means for picking up an image of an operator who operates said terminal unit; and
   (b) image pickup operation control means for controlling an image pickup operation of said image pickup means in accordance with the reference sync. signal supplied from said repeater.

5. A system according to claim 3, wherein said audio information input means includes speech pickup means for picking up speech from an operator who operates said terminal unit, and generates an audio signal corresponding to the picked-up speech.

6. A system according to claim 1, wherein said repeater includes multiimage forming means for forming a multiimage signal by separating the video information from information signals respectively supplied from the plurality of connected terminals units, and performing reduction/synthesis processing of the plurality of separated video information.

7. A system according to claim 2, wherein said repeater includes synthetic audio signal forming means for forming a synthetic audio signal by separating audio signals from information signals respectively supplied from the plurality of connected terminal units, and performing synthesis processing of the plurality of separated audio signals.

8. A system according to claim 7, wherein said synthetic audio signal forming means further includes speaker detection means for detecting, on the basis of a plurality of audio signals separated from information signals respectively supplied from the plurality of connected terminal units, whether any one of the plurality of operators who is operating one of said terminal units is generating speech, and generating a detection signal.

9. A system according to claim 8, wherein said repeater further includes multiimage forming means arranged to receive the detection signal generated by said speaker detection means, output a signal obtained by performing reduction/synthesis processing of a plurality of video information separated from information signals respectively supplied from the plurality of connected terminal units when the input detection signal does not inform that some operator who is operating one of said terminal units is generating speech, and output video information separated from an information signal supplied from one of the plurality of connected terminal units which is indicated by the input detection signal without performing the reduction/synthesis processing when the input detection signal informs that some operator who is operating one of said terminal units is generating speech.

10. A system according to claim 2, wherein said terminal unit includes:
    (a) a camera head unit for picking up an image of an operator who operates said terminal unit, and outputting a video signal corresponding to the picked-up image; and
    (b) a computer having an expansion board and an expansion slot in which said expansion board can be mounted, said expansion board having a camera head connection terminal to which said camera head unit can be connected, a microphone connection terminal to which a microphone for picking up speech from the operator who operates said terminal unit and generating an audio signal corresponding to the picked-up speech can be connected, and an information signal forming circuit for forming an information signal to be sent to said repeater by multiplexing the video signal supplied through the camera head connection terminal and the audio signal supplied through the microphone connection terminal, the terminals and the circuit being mounted on said expansion board, and said expansion board being separated from said camera head.

11. A system according to claim 10, wherein said camera head unit and the circuit mounted on said expansion board are arranged to receive power from said computer in which said expansion board is mounted.

12. A system according to claim 2, wherein said terminal unit includes:
    (a) a camera head unit for picking up an image of an operator who operates said terminal unit, and outputting a video signal corresponding to the picked-up image; and
    (b) an adaptor unit having a camera head connection terminal to which said camera head unit can be connected, a microphone connection terminal to which a microphone for picking up speech from the operator who operates said terminal unit and generating an audio signal corresponding to the picked-up speech can be connected, an information signal forming circuit for forming an information signal to be sent to said repeater by multiplexing the video signal supplied through the camera head connection terminal and the audio signal supplied through the microphone connection terminal, and an operation unit for instructing operations, said adaptor unit being stored in a single housing which is separated from said camera head.

13. A system according to claim 12, wherein said camera head unit and the circuit stored in said adaptor unit are arranged to receive power from a source outside of said adaptor unit.

14. A video communication system comprising:
(A) a terminal unit for transmitting/receiving an information signal including video information; and
(B) a repeater to which a plurality of terminal units each identical to said terminal unit can be connected, said repeater generating a reference sync. signal for causing the plurality of connected terminal units to synchronously generate the respective video information, supplying the generated reference sync. signal to each of the plurality of connected terminal units, forming a transmission signal to be transmitted to a transmission line by synthesizing the video information, respectively transmitted from the plurality of terminal units, synchronously with the reference sync. signal, and outputting the formed transmission signal to the transmission line, or receiving a transmission signal supplied from the transmission line and supplying the input transmission signal to each of the plurality of connected terminal units.

15. A system according to claim 14, wherein the information signal includes audio information in addition to the video information.

16. A system according to claim 15, wherein said terminal unit includes:
(a) video information input means for inputting video information to be transmitted;
(b) audio information input means for inputting audio information to be transmitted; and
(c) information signal forming means for forming an information signal by multiplexing the video information input by said video information input means and the audio information input by said audio information input means.

17. A system according to claim 16, wherein said video information input means includes:
(a) image pickup means for picking up an image of an operator who operates said terminal unit; and
(b) image pickup operation control means for controlling an image pickup operation of said image pickup means in accordance with the reference sync. signal supplied from said repeater.

18. A system according to claim 16, wherein said audio information input means further includes:
(a) speech pickup means for picking up speech from an operator who operates said terminal unit, and generates an audio signal corresponding to the picked-up speech; and
(b) subtraction means for separating an audio signal from the transmission signal supplied from said repeater, and subtracting the audio signal generated by said speech pickup means from the separated audio signal.

19. A system according to claim 14, wherein said repeater includes multiimage forming means for forming a multiimage signal by separating the video information from information signals respectively supplied from the plurality of connected terminals units, and performing reduction/synthesis processing of the plurality of separated video information.

20. A system according to claim 15, wherein said repeater includes synthetic audio signal forming means for forming a synthetic audio signal by separating audio signals from information signals respectively supplied from the plurality of connected terminal units, and performing synthesis processing of the plurality of separated audio signals.

21. A system according to claim 20, wherein said synthetic audio signal forming means further includes speaker detection means for detecting, on the basis of a plurality of audio signals separated from information signals respectively supplied from the plurality of connected terminal units, whether any one of the plurality of operators who is operating one of said terminal units is generating speech, and generating a detection signal.

22. A system according to claim 21, wherein said repeater further includes multiimage forming means arranged to receive the detection signal generated by said speaker detection means, output a signal obtained by performing reduction/synthesis processing of a plurality of video information separated from information signals respectively supplied from the plurality of connected terminal units when the input detection signal does not inform that some operator who is operating one of said terminal units is generating speech, and output video information separated from an information signal supplied from one of the plurality of connected terminal units which is indicated by the input detection signal without performing the reduction/synthesis processing when the input detection signal informs that some operator who is operating one of said terminal units is generating speech.

23. A system according to claim 15, wherein said terminal unit includes:
(a) a camera head unit for picking up an image of an operator who operates said terminal unit, and outputting a video signal corresponding to the picked-up image; and
(b) a computer having an expansion board and an expansion slot in which said expansion board can be mounted, said expansion board having a camera head connection terminal to which said camera head unit can be connected, a microphone connection terminal to which a microphone for picking up speech from the operator who operates said terminal unit and generating an audio signal corresponding to the picked-up speech can be connected, and an information signal forming circuit for forming an information signal to be sent to said repeater by multiplexing the video signal supplied through the camera head connection terminal and the audio signal supplied through the microphone connection terminal, the terminals and the circuit being mounted on said expansion board, and said expansion board being separated from said camera head.

24. A system according to claim 23, wherein said camera head unit and the circuit mounted on said expansion board are arranged to receive power from said computer in which said expansion board is mounted.

25. A system according to claim 15, wherein said terminal unit includes:
(a) a camera head unit for picking up an image of an operator who operates said terminal unit, and outputting a video signal corresponding to the picked-up image; and
(b) an adaptor unit having a camera head connection terminal to which said camera head unit can be connected, a microphone connection terminal to which a microphone for picking up speech from the operator who operates said terminal unit and generating an audio signal corresponding to the picked-up speech can be connected, an information signal forming circuit for forming an information signal to be sent to said repeater by multiplexing the video signal supplied through the camera head connection terminal and the audio signal supplied through the microphone connection terminal, a separation circuit for separating video and audio signals from a transmission signal supplied from said repeater, a video signal output terminal to which a television monitor apparatus for outputting the video signal separated by said separation circuit can be connected, an audio signal output terminal to which a speaker unit for outputting the audio signal separated by said separation circuit can be connected, and an operation unit for instructing operations, said adaptor unit being stored in a single housing which is separated from said camera head.

26. A system according to claim 25, wherein said camera head unit and the circuit stored in said adaptor unit are arranged to receive power from a source outside of said adaptor unit.

27. An information signal transmitting/receiving apparatus for transmitting an information signal including a video information signal to a plurality of terminal units and for receiving an information signal transmitted from each of the plurality of terminal units, comprising:

(A) connection means for simultaneously attaining connections to the plurality of terminal units; and (B) control means for generating a reference sync. signal for causing the plurality of connected terminal units to synchronously generate the respective video information signals, supplying the generated reference sync. signal to each of the plurality of connected terminal units, and forming a transmission signal, to be transmitted to a transmission line, from the information signals transmitted synchronously with the reference sync. signal respectively from the plurality of terminal units to output the formed transmission signal to the transmission line, the formed transmission signal being synthesized from the information signals.

28. An apparatus according to claim 27, wherein each information signal includes audio information in addition to the video information.

29. An apparatus according to claim 27, wherein each terminal unit includes:

(a) video information input means for inputting video information to be transmitted;

(b) audio information input means for inputting audio information to be transmitted; and (c) information signal forming means for forming an information signal by multiplexing the video information input by the video information input means and the audio information input by the audio information input means.

30. An apparatus according to claim 29, wherein the video information input means includes:

(a) image pickup means for picking up an image of an operator who operates the terminal unit; and (b) image pickup operation control means for controlling an image pickup operation of the image pickup means in accordance with the reference sync. signal supplied from said control means.

31. An apparatus according to claim 29, wherein the audio information input means includes speech pickup means for picking up speech from an operator who operates the terminal unit, and for generating an audio signal corresponding to the picked-up speech.

32. An apparatus according to claim 27, further comprising multiimage forming means for forming a signal by separating the video information signals from information signals respectively supplied from the plurality of connected terminals units, and performing reduction/synthesis processing of the plurality of separated video information signals.

33. An apparatus according to claim 28, further comprising synthetic audio signal forming means for forming a synthetic audio signal by separating audio signals from information signals respectively supplied from the plurality of connected terminals units, and performing synthesis processing of the plurality of separated audio signals.

34. An apparatus according to claim 33, wherein said synthetic audio signal forming means further includes speaker detection means for detecting, on the basis of a plurality of audio signals separated from information signals respectively supplied from the plurality of connected terminal units, whether any of the plurality of operators who is operating one of said terminal units is generating speech, and generating a detection signal.

35. An apparatus according to claim 34, further comprising multiimage forming means arranged to receive the detection signal generated by said speaker detection means, output a signal obtained by performing reduction/synthesis processing of a plurality of video information signals separated from information signals respectively supplied from the plurality of connected terminal units when the input detection signal does not inform that some operator who is operating one of the terminal units is generating speech, and output a video information signal separated from an information signal supplied from of the plurality of connected terminal units which is indicated by the input detection signal without performing the reduction/synthesis processing when the input detection signal informs that some operator who is operating one of the terminal units is generating speech.

36. An apparatus according to claim 28, wherein each terminal unit includes;

(a) a camera head unit of picking up an image of an operator who operates the terminal unit, and outputting a video signal corresponding to the picked-up image; and (b) a computer having an expansion board and an expansion slot in which the expansion board can be mounted, the expansion board having a camera head connection terminal to which the camera head unit can be connected, a microphone connection terminal to which a microphone for picking up to speech from the operator who operates the terminal unit and generating an audio signal corresponding to the picked-up speech can be connected, and an information signal forming circuit for forming an information signal to be sent to said control means by multiplexing the video signal supplied through the camera head connection terminal and the audio signal supplied through the microphone connection terminal, the terminals and the circuit being mounted on the expansion board, and the expansion board being separated from the camera head.

37. An apparatus according to claim 36, wherein the camera head unit and the circuit mounted on the expansion board are arranged to receive power from the computer in which the expansion board is mounted.

38. An apparatus according to claim 28, wherein each terminal unit includes:

(a) a camera head unit for picking up an image of an operator who operates the terminal unit, and outputting a video signal corresponding to the picked-up image; and (b) an adapter unit having a camera head connection terminal to which the camera head unit can be connected, a microphone connection terminal to which a microphone for picking up speech from the operator who operates the terminal unit and generating an audio signal corresponding to the picked-up speech can be connected, an information signal forming circuit for forming an information signal to be sent to said control means by multiplexing the video signal supplied through the camera head connection terminal and the audio signal supplied through the microphone connection terminal, and an operation unit for instructing operations, the adaptor unit being stored in a single housing which is separated from the camera head.

39. An apparatus according to claim 38, wherein the camera head unit and the circuit stored in the adaptor unit are arranged to receive power from a source outside of the adaptor unit.

40. An information signal transmitting/receiving apparatus for transmitting an information signal including a video information signal to a plurality of terminal units and for receiving an information signal from each of the plurality of terminal units, comprising:

(A) connection means for simultaneously attaining connections to the plurality of terminal units; and (B) control means for generating a reference sync signal for causing the plurality of connected terminal units to synchronously generate the respective video information signals, supplying the generated reference sync. signal to each of the plurality of connected terminal units, forming a transmission signal, to be transmitted to a transmission line, from the information signals transmitted synchronously with the reference sync. signal respectively from the plurality of terminal units to output the formed transmission signal to the transmission line, the formed transmission signal being synthesized from the information signals, and receiving a transmission signal supplied from the transmission line to supply the received transmission signal respectively to the plurality of connected terminal units.

41. An apparatus according to claim 40, wherein each information signal includes audio information in addition to the video information.

42. An apparatus according to claim 41, wherein each terminal unit includes:

(a) video information input means for inputting video information to be transmitted;

(b) audio information input means for inputting audio information to be transmitted; and (c) information signal forming means for forming an information signal by multiplexing the video information input by the video information input means and the audio information input by the audio information input means.

43. An apparatus according to claim 42, wherein the video information input means includes:

(a) image pickup means for picking up an image of an operator who operates the terminal unit; and (b) image pickup operation control means for controlling an image pickup operation of the image pickup means in accordance with the reference sync. signal supplied from said control means.

44. An apparatus according to claim 42, wherein the audio information input means further includes:

(a) speech pickup means for picking up speech from an operator who operates the terminal unit, and generates an audio signal corresponding to the picked-up speech; and (b) subtraction means for separating an audio signal from the transmission signal supplied from the transmission line, and subtracting the audio signal generated by the speech pickup means from the separated audio signal.

45. An apparatus according to claim 40, further comprising multiimage forming means for forming a multiimage signal by separating the video information signals from information signals respectively supplied from the plurality of connected terminals units, and performing reduction/synthesis processing of the plurality of separated video information signals.

46. An apparatus according to claim 41, further comprising synthetic audio signal forming means for forming a synthetic audio signal by separating audio signals from information signals respectively supplied from the plurality of connected terminal units, and performing synthesis processing of the plurality of separated audio signals.

47. An apparatus according to claim 46, wherein said synthetic audio signal forming means further includes speaker detection means for detecting, on the basis of a plurality of audio signals separated from information signals respectively supplied from the plurality of connected terminal units, whether any one of the plurality of operators who is operating one of the terminal units is generating speech, and generating a detection signal.

48. An apparatus according to claim 47, further comprising multiimage forming means arranged to receive the detection signal generated by said speaker detection means, output a signal obtained by performing reduction/synthesis processing of a plurality of video information signals separated from information signals respectively supplied from the plurality of connected terminal units when the input detection signal does not inform that some operator who is operating one of the terminal units is generating speech, and output a video information signal separated from an information signal supplied from one of the plurality of connected terminal units which is indicated by the input detection signal without performing the reduction/synthesis processing when the input detection signal informs that some operator who is operating one of the terminal units is generating speech.

49. An apparatus according to claim 41, wherein each terminal unit includes:

(a) a camera head unit for picking up an image of an operator who operates the terminal unit, and outputting a video signal corresponding to the picked-up image; and (b) a computer having an expansion board and an expansion slot in which the expansion board can be mounted, the expansion board having a camera head connection terminal to which the camera head unit can be connected, a microphone connection terminal to which a microphone for picking up speech from the operator who operates the terminal unit and generating an audio signal corresponding to the picked-up speech can be connected, and an information signal forming circuit for forming an information signal to be sent to said control means by multiplexing the video signal supplied through the camera head connection terminal and the audio signal supplied through the microphone connection terminal, the terminals and the circuit being mounted on the expansion board, and the expansion board being separated from the camera head.

50. An apparatus according to claim 49, wherein the camera head unit and the circuit mounted on the expansion board are arranged to receive power from the computer in which the expansion board is mounted.

51. An apparatus according to claim 41, wherein each terminal unit includes:
(a) a camera head unit for picking up an image of an operator who operates the terminal unit, and outputting a video signal corresponding to the picked-up image; and
(b) an adapter unit having a camera head connection terminal to which the camera head unit can be connected, a microphone connection terminal to which a microphone for picking up speech from the operator who operates the terminal unit and generating an audio signal corresponding to the picked-up speech can be connected, an information signal forming circuit for forming an information signal to be sent to said control means by multiplexing the video signal supplied through the camera head connection terminal and the audio signal supplied through the microphone connection terminal, a separation circuit for separating video and audio signals from a transmission signal supplied from said control means, a video signal output terminal to which a television monitor apparatus for outputting the video signal separated by the separation circuit can be connected, an audio signal output terminal to which a speaker unit for outputting the audio signal separated by the separation circuit can be connected, and an operation unit for instructing operations, the adaptor unit being stored in a single housing which is separated from the camera head.

52. An apparatus according to claim 51, wherein the camera head unit and the circuit stored in the adaptor unit are arranged to receive power from a source outside of the adaptor unit.

53. An information signal transmitting/receiving method of transmitting an information signal including a video information signal to a plurality of terminal units and for receiving an information signal transmitted from each of the plurality of terminal units, comprising:
(A) a reference sync. signal supplying step of generating a reference sync. signal for causing the plurality of connected terminal units to synchronously generate the respective video information signals and supplying the generated reference sync. signal to each of the plurality of terminal units; and
(B) a transmission signal outputting step of forming a transmission signal, to be transmitted to a transmission line, from the information signals transmitted synchronously with the reference sync. signal respectively from the plurality of terminal units and outputting the formed transmission signal to the transmission line, the formed transmission signal being synthesized from the information signals.

54. A method according to claim 53, wherein each information signal includes audio information in addition to the video information.

55. A method according to claim 53, further comprising, at each terminal:
(a) a video information input step of inputting video information to be transmitted;
(b) an audio information input step of inputting audio information to be transmitted; and
(c) an information signal forming step of forming an information signal by multiplexing the video information input by said video information input steps and the audio information input by said audio information input step.

56. A method according to claim 55, wherein said video information input step includes:

(a) an image pickup step of picking up an image of an operator who operates the terminal unit; and
(b) an image pickup operation control step of controlling an image pickup operation of said image pickup step in accordance with the reference sync. signal supplied from said reference sync. signal supplying step.

57. A method according to claim 55, wherein said audio information input step includes a speech pickup step of picking up speech from an operator who operates the terminal units, and generating an audio signal corresponding to the picked-up speech.

58. A method according to claim 53, further comprising a multiimage forming step of forming a multiimage signal by separating the video information signals from information signals respectively supplied from the plurality of connected terminals units, and performing reduction/synthesis processing of the plurality of separated video information signals.

59. A method according to claim 54, further comprising a synthetic audio signal forming step of forming a synthetic audio signal by separating audio signals from information signals respectively supplied from the plurality of connected terminal units, and performing synthesis processing of the plurality of separated audio signals.

60. A method according to claim 59, wherein said synthetic audio signal forming step further includes a speaker detection step of detecting, on the basis of a plurality of audio signals separated from information signals respectively supplied from the plurality of connected terminal units, whether any one of the plurality of operators who is operating one of the terminal units is generating speech, and generating a detection signal.

61. A method according to claim 60, further comprising a multiimage forming step arranged to receive the detection signal generated by said speaker detection step, output a signal obtained by performing reduction/synthesis processing of a plurality of video information signals separated from information signals respectively supplied from the plurality of connected terminal units when the input detection signal does not inform that some operator who is operating one of the terminal units is generating speech, and output a video information signal separated from an information signal supplied from one of the plurality of connected terminal units which is indicated by the input detection signal without performing the reduction/synthesis processing when the input detection signal informs that some operator who is operating one of the terminal units is generating speech.

62. An information signal transmitting/receiving method of transmitting an information signal including a video information signal to a plurality of terminal units and for receiving an information signal transmitted from each of the plurality of terminal units, comprising:
(A) a reference sync signal supplying step of generating a reference sync. signal for causing the plurality of connected terminal units to synchronously generate the respective video information and supplying the generated reference sync. signal to each of the plurality of connected terminal units;
(B) a transmission signal outputting step of forming a transmission signal to be transmitted, to a transmission line, from the information signals transmitted synchronously with the reference sync. signal respectively from the plurality of terminal units and outputting the formed transmission signal to the transmission line, the formed transmission signal being synthesized from the information signals; and
(C) a transmission signal supplying step of a transmission signal supplied from the transmission line and supplying the received transmission signal respectively to the plurality of connected terminal units.

63. A method according to claim 62, wherein each information signal includes audio information in addition to the video information.

64. A method according to claim 63, further comprising, in each terminal unit:

(a) a video information input step of inputting video information to be transmitted;

(b) an audio information input step of inputting audio information to be transmitted; and (c) an information signal forming step of forming an information signal by multiplexing the video information input by said video information input step and the audio information input by said audio information input step.

65. A method according to claim 64, wherein said video information input step includes:

(a) an image pickup step of picking up an image of an operator who operates the terminal unit; and (b) an image pickup operation control step of controlling an image pickup operation of said image pickup step in accordance with the reference sync. signal supplied from said reference sync. signal supplying step.

66. A method according to claim 64, wherein said audio information input step further includes:

(a) a speech pickup step of picking up speech from an operator who operates the terminal unit, and generating an audio signal corresponding to the picked-up speech; and (b) a subtraction step of separating an audio signal from the transmission signal supplied from said transmission signal supplying step; and subtracting the audio signal generated by said speech pickup step from the separated audio signal.

67. A method according to claim 62, further comprising a multiimage forming step of forming a multiimage signal by separating the video information signals from information signals respectively supplied from the plurality of connected terminals units, and performing reduction/synthesis processing of the plurality of separated video information signals.

68. A method according to claim 63, further comprising a synthetic audio signal forming step of forming a synthetic audio signal by separating audio signals from information signals respectively supplied from the plurality of connected terminal units, and performing synthesis processing of the plurality of separated audio signals.

69. A method according to claim 68, wherein said synthetic audio signal forming step further includes a speaker detection step of detecting, on the basis of a plurality of audio signals separated from information signals respectively supplied from the plurality of connected terminal units, whether any one of the plurality of operators who is operating one of the terminal units is generating speech, and generating a detection signal.

70. A method according to claim 69, further comprising a multiimage forming step arranged to receive the detection signal generated by said speaker detection step, output a signal obtained by performing reduction/synthesis processing of a plurality of video information signals separated from information signals respectively supplied from the plurality of connected terminal units when the input detection signal does not inform that some operator who is operating one of the terminal units is generating speech, and output video information separated from an information signal supplied from one of the plurality of connected terminal units which is indicated by the input detection signal without performing the reduction/synthesis processing when the input detection signal informs that some operator who is operating one of terminal units is generating speech.

* * * * *

UNITED STATES PATENT AND TRADEMARK OFFICE
CERTIFICATE OF CORRECTION

PATENT NO. : 5,982,415

DATED : November 9, 1999

INVENTOR(S) : TSUGUHIDE SAKATA

It is certified that error appears in the above-identified patent and that said Letters Patent is hereby corrected as shown below:

COLUMN 1

Line 31, "seating" should read --sitting--.

COLUMN 4

Line 26, "on" should read --of--.

COLUMN 22

Line 27, "of" (first occurrence) should be deleted.
  Line 34, "includes;" should read --includes:--.

UNITED STATES PATENT AND TRADEMARK OFFICE
CERTIFICATE OF CORRECTION

PATENT NO. : 5,982,415

DATED : November 9, 1999

INVENTOR(S) : TSUGUHIDE SAKATA

It is certified that error appears in the above-identified patent and that said Letters Patent is hereby corrected as shown below:

COLUMN 28

Line 33, "of" should read --of the--.

Signed and Sealed this

Tenth Day of October, 2000

*Attest:*

Q. TODD DICKINSON

*Attesting Officer*   *Director of Patents and Trademarks*